US012615085B2

(12) United States Patent
Luo et al.

(10) Patent No.: US 12,615,085 B2
(45) Date of Patent: Apr. 28, 2026

(54) OPTICAL SIGNAL CONTROL METHOD AND APPARATUS, OPTICAL TRANSMISSION NODE, AND OPTICAL TRANSMISSION SYSTEM

(71) Applicant: Huawei Technologies Co., Ltd., Shenzhen (CN)

(72) Inventors: Jun Luo, Dongguan (CN); Zhiyong Feng, Dongguan (CN); Jian Zhong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 539 days.

(21) Appl. No.: 18/175,055

(22) Filed: Feb. 27, 2023

(65) Prior Publication Data

US 2023/0224062 A1 Jul. 13, 2023

Related U.S. Application Data

(63) Continuation of application No. PCT/CN2021/113099, filed on Aug. 17, 2021.

(30) Foreign Application Priority Data

Aug. 31, 2020 (CN) .......................... 202010901207.1

(51) Int. Cl.
*H04B 10/07* (2013.01)
*H04B 10/079* (2013.01)
*H04J 14/02* (2006.01)

(52) U.S. Cl.
CPC .... *H04B 10/07955* (2013.01); *H04J 14/0212* (2013.01); *H04J 14/0227* (2013.01); *H04J 14/0307* (2023.08)

(58) Field of Classification Search
CPC .......... H04B 10/07955; H04B 10/0791; H04B 10/07953; H04J 14/0212; H04J 14/0227;
(Continued)

(56) References Cited

U.S. PATENT DOCUMENTS 5,959,749 A * 9/1999 Danagher ........... H04J 14/0221
385/24
8,401,386 B2 * 3/2013 Izumi ................. H04Q 11/0005
398/33
(Continued)

FOREIGN PATENT DOCUMENTS

CN 1859061 A 11/2006
WO 2013170909 A1 11/2013
WO 2018187930 A1 10/2018

*Primary Examiner* — Tanya T Motsinger
(74) *Attorney, Agent, or Firm* — Slater Matsil, LLP

(57) ABSTRACT

This application discloses an optical signal control method and apparatus, and belongs to the optical communication field. The apparatus includes: a light source, configured to output a first optical signal; an optical switch module, configured to receive the first optical signal and an external second optical signal, and output a third optical signal; and a detection module, configured to detect whether a power change of the second optical signal on at least one wavelength channel is greater than a preset power change threshold, if so, the optical switch module adjusts on/off states of at least one wavelength channel of the received first optical signal and the at least one wavelength channel of the received second optical signal, so that an adjusted first optical signal and an adjusted second optical signal are combined to obtain the third optical signal.

17 Claims, 12 Drawing Sheets

501

Detect whether a power change of a second optical signal outside an optical signal control apparatus on at least one wavelength channel is greater than a preset power change threshold

502

Adjust, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal

(58) Field of Classification Search
  CPC ............. H04J 14/0307; H04J 14/02219; H04J
                  14/02214; H04J 14/0202
  See application file for complete search history.

(56)                 References Cited

U.S. PATENT DOCUMENTS

| | | | |
|---|---|---|---|
| 10,237,633 B2 | 3/2019 | Chedore et al. | |
| 10,530,474 B2 * | 1/2020 | Yuki | H04J 14/02216 |
| 2003/0007722 A1 * | 1/2003 | Caroli | H04J 14/0206 |
| | | | 385/24 |
| 2003/0048508 A1 * | 3/2003 | Yu | H04J 14/0297 |
| | | | 398/91 |
| 2004/0161241 A1 * | 8/2004 | Tomofuji | H04B 10/25133 |
| | | | 398/147 |
| 2004/0208520 A1 * | 10/2004 | Palacharla | H04J 14/0287 |
| | | | 398/30 |
| 2007/0237524 A1 * | 10/2007 | Gerstel | H04J 14/0284 |
| | | | 398/83 |
| 2008/0260383 A1 * | 10/2008 | Zhong | H04J 14/0297 |
| | | | 398/50 |
| 2009/0162067 A1 * | 6/2009 | Kobayashi | H04J 14/02216 |
| | | | 398/79 |
| 2010/0142961 A1 * | 6/2010 | Wisseman | H04J 14/02122 |
| | | | 398/83 |
| 2010/0202777 A1 * | 8/2010 | Liu | H04J 14/0204 |
| | | | 398/83 |
| 2010/0221004 A1 * | 9/2010 | Haslam | H04J 14/0212 |
| | | | 398/49 |
| 2010/0260499 A1 * | 10/2010 | Izumi | H04J 14/0307 |
| | | | 398/48 |
| 2011/0076016 A1 * | 3/2011 | Wisseman | H04J 14/0204 |
| | | | 398/83 |
| 2011/0081146 A1 * | 4/2011 | Nakajima | H04J 14/0212 |
| | | | 398/48 |
| 2011/0286745 A1 * | 11/2011 | Sugahara | H04B 10/07955 |
| | | | 398/48 |
| 2013/0028604 A1 * | 1/2013 | Gao | H04J 14/0219 |
| | | | 398/83 |
| 2013/0251365 A1 * | 9/2013 | Sone | H04B 10/07955 |
| | | | 398/38 |
| 2013/0294770 A1 * | 11/2013 | Hino | H04J 14/0287 |
| | | | 398/34 |
| 2017/0250752 A1 * | 8/2017 | Yuki | H04B 10/07955 |
| 2017/0303016 A1 * | 10/2017 | Barad | H04Q 11/0005 |
| 2017/0366291 A1 * | 12/2017 | Boduch | H04J 14/0205 |
| 2018/0198529 A1 * | 7/2018 | Boxer | H04B 10/25759 |
| 2018/0269964 A1 * | 9/2018 | Mertz | G02B 6/02061 |
| 2019/0115977 A1 * | 4/2019 | Yuki | H04J 14/02216 |
| 2021/0266089 A1 * | 8/2021 | Lin | H04J 14/0212 |
| 2022/0021955 A1 * | 1/2022 | Juneja | H04J 14/0295 |
| 2025/0284066 A1 * | 9/2025 | Montgomery | G02B 6/3546 |

* cited by examiner

Before
modulation

After
modulation

OPTICAL SIGNAL CONTROL METHOD AND APPARATUS, OPTICAL TRANSMISSION NODE, AND OPTICAL TRANSMISSION SYSTEM

CROSS-REFERENCE TO RELATED APPLICATIONS

This application is a continuation of International Application No. PCT/CN2021/113099, filed on Aug. 17, 2021, which claims priority to Chinese Patent Application No. 202010901207.1, filed on Aug. 31, 2020. The disclosures of the aforementioned applications are hereby incorporated by reference in their entireties.

TECHNICAL FIELD

This application relates to the optical communication field, and in particular, to an optical signal control method and apparatus, an optical transmission node, and an optical transmission system.

BACKGROUND

In a wavelength division multiplexing (WDM) optical transmission system, service information that needs to be transmitted is modulated to be transmitted at different optical frequencies, that is, transmitted on different wavelength channels.

When the service information is transmitted by using a wavelength division multiplexing optical signal in a target wavelength band (for example, a C wavelength band), because wavelength channels of the wavelength division multiplexing optical signal affect each other, if a power change of the wavelength division multiplexing optical signal on a wavelength channel is great, for example, if the wavelength channel is in a wave drop state or a wave add state, optical transmission performance of a remaining wavelength channel other than the wavelength channel of the optical signal deteriorates under the actions of, for example, stimulated Raman scattering (SRS) effects of an optical amplifier and an optical fiber in the optical transmission system.

SUMMARY

Embodiments of this application provide an optical signal control method and apparatus, an optical transmission node, and an optical transmission system.

According to a first aspect, an optical signal control apparatus is provided. The apparatus includes: a light source, configured to output a first optical signal, where the first optical signal is usually an optical signal that does not carry service information and may be referred to as dummy light, and the light source is a wide spectrum light source, and a wavelength band of the light source covers a preset target wavelength band; an optical switch module, where the optical switch module has a first input end, a second input end, and an output end, the first input end is configured to receive the first optical signal, the second input end is configured to receive an external second optical signal, the output end is configured to output a third optical signal, and the second optical signal is usually an optical signal that carries service information and may be referred to as a true wave signal; and a detection module, configured to detect whether a power change of the second optical signal on at least one wavelength channel is greater than a preset power change threshold, where that the power change on the at least one wavelength channel is greater than the power change threshold indicates a wave drop state or a wave add state, the wave drop state is a state in which the at least one wavelength channel changes from having a wave to having no wave, and the wave add state is a state in which the at least one wavelength channel changes from having no wave to having a wave; where the optical switch module is further configured to: after the detection module detects that the power change on the at least one wavelength channel is greater than the power change threshold, adjust on/off states of at least one wavelength channel of the received first optical signal and the at least one wavelength channel of the received second optical signal, so that an adjusted first optical signal and an adjusted second optical signal are combined to obtain the third optical signal.

After the detection module detects that the power change of the second optical signal on the at least one wavelength channel is greater than the power change threshold, the optical switch module of the optical signal control apparatus provided in this embodiment of this application adjusts the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great, the second optical signal is updated to the third optical signal for output. This effectively reduces optical transmission performance deterioration in a remaining wavelength channel caused by the power change on the at least one wavelength channel.

The optical switch module may be configured to implement mutual replacement between a first wavelength channel of the first optical signal and a first wavelength channel of the second optical signal. The mutual replacement process includes: replacing the first wavelength channel of the second optical signal with the first wavelength channel of the first optical signal, or replacing the first wavelength channel of the first optical signal with the first wavelength channel of the second optical signal. A wavelength of the first wavelength channel of the second optical signal is equal to that of the first wavelength channel of the first optical signal. In this way, a wavelength channel combination of the final output third optical signal can be made unchanged relative to the second optical signal (that is, a second optical signal before a wave add or a wave drop) transmitted by a transmitting end.

In an optional implementation, a pilot signal having a plurality of pilot frequencies is modulated on wavelength channels of the second optical signal that carry service information, and the plurality of pilot frequencies respectively correspond to a plurality of wavelength channels. The detection module is configured to detect the pilot signal. The optical switch module is configured to: after the detection module detects that at least one pilot frequency is switched from a signal non-lost state to a signal lost state, determine that a wavelength channel corresponding to the at least one pilot frequency is in the wave drop state; or after the detection module detects that at least one pilot frequency is switched from a signal lost state to a signal non-lost state, determine that a wavelength channel corresponding to the at least one pilot frequency is in the wave add state. A status of a wavelength channel can be detected quickly by detecting the pilot signal.

For example, the detection module may periodically detect statuses of a pilot frequency, and determine, based on statuses of the pilot frequency in each two adjacent detection periods, whether status switching occurs in the pilot frequency. When a status of the pilot frequency in a current detection period is a signal non-lost state, and a status of the pilot frequency in a previous detection period is a signal lost state, it is determined that the pilot frequency is switched from the signal lost state to the signal non-lost state. When a status of the pilot frequency in a current detection period is a signal lost state, and a status of the pilot frequency in a previous detection period is a signal non-lost state, it is determined that the pilot frequency is switched from the signal non-lost state to the signal lost state.

It is assumed that the optical signal control apparatus is disposed between a wavelength selective switch (WSS) and an optical amplifier. An input end of the detection module (namely, a detection end) may be connected to an output end x of the WSS, namely, a multiplexing port of the WSS. In an optional implementation, the detection module further includes at least one other input end, and the at least one other input end is connected to at least one of an output end y of the optical signal control apparatus or an output end z of the optical amplifier.

The output end y of the optical signal control apparatus is an output end c of the third optical signal. When the other input ends of the detection module are connected to the output end y, the detection module may further detect a relationship between optical signals that are obtained from the output end x and the output end y, determine, based on the relationship between the optical signals, whether the optical signal control apparatus is faulty, and when determining that the optical signal control apparatus is faulty, send alarm information indicating that the optical signal control apparatus is faulty.

When the other input ends of the detection module are connected to both the output end y and the output end z, the detection module may further detect a relationship between optical signals that are obtained from the output end y and the output end z, determine, based on the relationship between the optical signals, whether the optical amplifier is faulty, and when determining that the optical amplifier is faulty, send alarm information indicating that the optical amplifier is faulty.

When the other input ends of the detection module are connected to the output end z, the detection module may further detect a relationship between optical signals that are obtained from the output end x and the output end z, determine, based on the relationship between the optical signals, whether the optical amplifier is faulty, and when determining that the optical amplifier is faulty, send alarm information indicating that the optical amplifier is faulty.

A function of an optical transmission node can be calibrated in time by detecting the output end y and/or the output end z, to avoid service interruption or a transmission error caused by a fault of an optical component in the optical transmission node.

In an optional implementation, the optical switch module is configured to: after determining that the first wavelength channel of the second optical signal is in the wave drop state, control the first wavelength channel of the first optical signal received by the first input end to be switched on, and control the first wavelength channel of the second optical signal received by the second input end to be switched off; or after determining that the first wavelength channel of the second optical signal is in the wave add state, control the first wavelength channel of the first optical signal received by the first input end to be switched off, and control the first wavelength channel of the second optical signal received by the second input end to be switched on, where the wavelength of the first wavelength channel of the first optical signal is equal to that of the first wavelength channel of the second optical signal.

For example, the optical switch module is configured to: perform first filtering processing on the first wavelength channel to make the first wavelength channel switched on, where the wavelength of the first wavelength channel that is switched on falls within a band-pass filtering range; and perform second filtering processing on the first wavelength channel to make the first wavelength channel switched off, where the wavelength of the first wavelength channel that is switched off falls within a band-stop filtering range.

The first filtering processing and the second filtering processing are opposite filtering processing, and have a plurality of implementations. The following two implementations are used as examples for description in this embodiment of this application.

In a first implementation, the first filtering processing and the second filtering processing are overall filtering processing loaded on an optical signal. It is assumed that the first wavelength channel is a first wavelength channel of any optical signal M in the first optical signal and the second optical signal. A process of performing the first filtering processing on the first wavelength channel to make the first wavelength channel switched on includes: loading a first filtering curve for the optical signal M, where a filtering characteristic of the first filtering curve on the first wavelength channel is a switch-on characteristic, and a filtering characteristic of the first filtering curve on a wavelength channel other than the first wavelength channel is a switch-off characteristic. A process of performing the second filtering processing on the first wavelength channel to make the first wavelength channel switched off includes: loading a second filtering curve for the optical signal M, where a filtering characteristic of the second filtering curve on the first wavelength channel is a switch-off characteristic, and a filtering characteristic of the second filtering curve on the wavelength channel other than the first wavelength channel is a switch-on characteristic.

In the first implementation, a filtering curve loaded for the optical signal is only the first filtering curve or the second filtering curve, and therefore the processing process is simple.

In a second implementation, the first filtering processing and the second filtering processing are partial filtering processing loaded on an optical signal. A plurality of grid windows in the target wavelength band are configured in the optical signal control apparatus, such as the optical switch module. The plurality of grid windows include grid windows corresponding to a plurality of specified wavelength channels in the target wavelength band. For a division manner of the plurality of grid windows, refer to a division manner of grid windows of a wavelength division multiplexing system defined in an International Telecommunication Union Telecommunication Standardization Sector (ITU-T) G.694.1 standard, that is, a center wavelength of each grid window is preset. In the second implementation, segmented filtering is performed on the optical signal in the division manner of grid windows, to implement precise filtering.

The detection module may detect the pilot signal in a plurality of manners. For example, the optical signal control apparatus further includes: an optical splitter, configured to split the second optical signal into a fourth optical signal with a partial power, for example, a ratio of the power of the fourth optical signal to a power of the second optical signal ranges from 1% to 10%, for example, 5%; and an optical-to-electrical converter, configured to convert the fourth optical signal into an electrical signal, and output the converted electrical signal to the detection module. For example, the optical-to-electrical converter may be a photodiode (PD).

In this embodiment of this application, the optical switch module has two input ends and one output end, so that optical signal scheduling can be implemented. Therefore, the optical switch module may be considered as a 2×1 WSS (namely, a WSS with two input ends and one output end). A structure of the 2×1 WSS may be implemented in a plurality of optional implementations. The following two optional implementations are used as examples for description in this embodiment of this application.

In a first optional implementation, the optical switch module mainly includes at least two optical filters. For example, the optical switch module includes: a first optical filter having an input end and an output end, where the input end of the first optical filter is the first input end, and the first optical filter is configured to filter the received first optical signal; a second optical filter having an input end and an output end, where the input end of the second optical filter is the second input end, the second optical filter is configured to filter the received second optical signal, and a filtering characteristic of the first optical filter is opposite to that of the second optical filter for wavelength channels whose wavelengths are equal; and an optical combiner, where the optical combiner has two input ends and one output end, the two input ends are respectively connected to the output end of the first optical filter and the output end of the second optical filter, the output end of the optical combiner is the output end of the optical switch module, and the optical combiner is configured to combine a filtered first optical signal and a filtered second optical signal that are received by the two input ends, to obtain the third optical signal.

For example, at least one of the first optical filter or the second optical filter is a wavelength blocker (WB). For example, both the first optical filter and the second optical filter are wavelength blockers. The wavelength blocker has a wavelength selective characteristic.

In an optional manner, the first optical filter and the second optical filter may be implemented by using one of the following technologies: a liquid crystal on silicon (LCOS) technology, a digital light processing (DLP) technology, a planar lightwave circuit (PLC) technology, a liquid crystal (LC) technology, or a micro-electro-mechanical system (MEMS) technology.

In this embodiment of this application, a split ratio between the optical combiner and the input end connected to the first optical filter is not equal to a split ratio between the optical combiner and the input end connected to the second optical filter. For example, the split ratio between the optical combiner and the input end connected to the first optical filter is less than the split ratio between the optical combiner and the input end connected to the second optical filter. The split ratio is a proportion of a split path (a path that is of the optical combiner and that is connected to the first optical filter or another path that is of the optical combiner and that is connected to the second optical filter) optical signal to a combined path (an output path of the optical combiner) optical signal.

By setting the split ratio between the optical combiner and the input end connected to the first optical filter to be less than the split ratio between the optical combiner and the input end connected to the second optical filter, it can be ensured that a proportion of an optical power of the first optical signal to an optical power of the final output third optical signal is smaller, and that a proportion of the optical power of the second optical signal to the optical power of the final output third optical signal is larger. In this way, in the optical combiner, an insertion loss of a path from the input end connected to the first optical filter to the output end is less than an insertion loss of a path from the input end connected to the second optical filter to the output end. This reduces an insertion loss of the third optical signal during actual transmission in the optical combiner, thereby avoiding a loss of the service information.

In a second optional implementation, the optical switch module mainly includes a plurality of optical switches (also referred to as an optical switch array). For example, the optical switch module includes: a first optical demultiplexer having an input end and n third output ends, a second optical demultiplexer having an input end and n fourth output ends, n optical switches, and an optical combiner, where n is a positive integer greater than 1, each of the n optical switches has a third input end, a fourth input end, and a fifth output end, and the optical combiner has n input ends and one output end; the input end of the first optical demultiplexer is the first input end, and the first optical demultiplexer is configured to: perform demultiplexing on the received first optical signal to obtain optical signals with n wavelength channels, and input the optical signals with the n wavelength channels to third input ends of the n optical switches respectively through the n third output ends; the input end of the second optical demultiplexer is the second input end, and the second optical demultiplexer is configured to: perform demultiplexing on the received second optical signal to obtain optical signals with n wavelength channels, and input the optical signals with the n wavelength channels to fourth input ends of the n optical switches respectively through the n fourth output ends; a wavelength of the optical signal received from the third input end of each optical switch is equal to that of the optical signal received from the fourth input end of the optical switch, and each optical switch is configured to select, from the optical signal received from the third input end and the optical signal received from the fourth input end, one path of optical signal to be output from the fifth output end; and the output end of the optical combiner is the output end of the optical switch module, the n input ends of the optical combiner are configured to respectively receive n optical signals output by the n optical switches, and the optical combiner is configured to combine the n optical signals to obtain the third optical signal.

In summary, after the detection module detects that the power change of the second optical signal on the at least one wavelength channel is greater than the power change threshold, the optical switch module of the optical signal control apparatus provided in this embodiment of this application adjusts the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great, the wavelength channel of the second optical signal whose power change is great is replaced with a corresponding wavelength channel of the first optical signal, to obtain the third optical signal. A power of the third optical signal is stable. This can reduce a wavelength channel combination change of the target wavelength band, and reduce a gain change of each wavelength channel in the optical amplifier and an optical power change of each wavelength channel caused by SRS, thereby reducing deterioration in an optical power and a signal-to-noise ratio of the wavelength channel, reducing bit errors of a receiver, and reducing impact on performance of an optical transmission system.

In addition, when the third optical signal is an optical signal whose target wavelength band is in a full-wave state, performance deterioration in the remaining wavelength channel can be further reduced.

The optical signal control apparatus provided in this embodiment of this application is disposed outside the WSS in the optical transmission node. No additional port of the WSS device needs to be occupied, so that the structure of the WSS in the optical transmission node is simplified, and manufacturing costs of the WSS are reduced. In addition, because a structure off the optical signal control apparatus is simplified compared with that of a conventional WSS, the optical signal control apparatus can implement quick replacement between the dummy light and the true wave signal, and a replacement speed is increased from a conventional second level to a millisecond level. This reduces a possible service interruption time, or controls service interruption duration to be less than or equal to 50 ms, to implement an unperceivable interruption delay for an upper-layer service.

According to a second aspect, an optical transmission node is provided. The optical transmission node includes a WSS and/or an optical amplifier, and further includes the optical signal control apparatus according to any one of the first aspect or the optional implementations of the first aspect.

In an optional implementation, the optical transmission node includes one or more WSSs, and an optical signal control apparatus is disposed after at least one WSS. For example, one optical signal control apparatus is disposed after each WSS.

Optionally, the optical transmission node includes one or more WSSs and a one-stage optical amplifier disposed after each WSS, and each optical signal control apparatus is located between one WSS and one one-stage optical amplifier; or the optical transmission node includes multi-stage optical amplifiers, and the optical signal control apparatus is located between any adjacent two-stage optical amplifiers of the multi-stage optical amplifiers, where the optical amplifier may be an erbium-doped fiber amplifier (EDFA), a Raman amplifier, or another optical amplifier.

For example, the target wavelength band within which the second optical signal falls is an S wavelength band, a C wavelength band, or an L wavelength band.

In summary, after detecting that the power change of the second optical signal on the at least one wavelength channel is greater than the power change threshold, the optical signal control apparatus in the optical transmission node provided in this embodiment of this application adjusts the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great, the second optical signal is updated to the third optical signal for output. This effectively reduces optical transmission performance deterioration in a remaining wavelength channel caused by the power change on the at least one wavelength channel.

According to a third aspect, an optical transmission system is provided. The optical transmission system includes at least two optical transmission nodes, and the optical transmission node is the optical transmission node according to any one of the second aspect or the optional implementations of the second aspect. Target wavelength bands corresponding to different optical transmission nodes are different from each other.

In an optional manner, each optical transmission node includes an optical amplifier, and the optical transmission system further includes: a power detection module, configured to detect power information of the at least two optical transmission nodes; and a gain control module, configured to perform, based on the power information of the at least two optical transmission nodes, optical amplifier gain control on at least two target wavelength bands corresponding to the at least two optical transmission nodes.

The power information is instantaneous power values, and the gain control module is configured to: calculate a power change value of each of the at least two optical transmission nodes based on the instantaneous power values of the at least two optical transmission nodes; and perform optical amplifier gain control on the at least two target wavelength bands based on the power change value of each optical transmission node.

It is assumed that the optical transmission system has one or more optical transmission structures, where a first optical transmission structure is one of the one or more optical transmission structures, the first optical transmission structure includes Q optical transmission nodes, and $Q\geq2$, for example, $2\leq Q\leq3$. The first optical transmission structure includes a power detection module 401 and a gain control module 402.

In the first optical transmission structure, the power detection module 401 is configured to determine an instantaneous power value of an optical power of each of Q target wavelength bands based on received electrical signals transmitted by Q optical-to-electrical converters 406, where the instantaneous power value of the optical power of each of the Q target wavelength bands is instantaneous power values of Q same-stage optical amplifiers corresponding to different target wavelength bands. The Q optical amplifiers are optical amplifiers used by the power detection module 401 to perform detection.

Correspondingly, the gain control module 402 is further configured to separately perform, based on the determined power change value of each of the Q target wavelength bands, gain control on the optical amplifiers corresponding to the Q target wavelength bands. For example, power changes caused by a stimulated Raman scattering effect are inversely compensated, so that performance of the system is more stable.

According to a fourth aspect, an optical signal control method is provided. The method includes: detecting whether a power change of a second optical signal outside an optical signal control apparatus on at least one wavelength channel is greater than a preset power change threshold; and adjusting, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal.

According to the optical signal control method provided in this embodiment of this application, the on/off states of the at least one wavelength channel of the received first optical signal and the at least one wavelength channel of the received second optical signal are adjusted after it is detected that the power change of the second optical signal on the at least one wavelength channel is greater than the power change threshold, so that the adjusted first optical signal and the adjusted second optical signal are combined to obtain the third optical signal, and the third optical signal is output. When the power change of the second optical signal on the at least one wavelength channel is great (for example, the wavelength channel is in a wave add state or a wave drop state), the wavelength channel of the second optical signal whose power change is great is replaced with a corresponding wavelength channel of the first optical signal, to obtain the third optical signal. A power of the third optical signal is stable. This can reduce a wavelength channel combination change of a target wavelength band, and reduce a gain change of each wavelength channel in an optical amplifier and an optical power change of each wavelength channel caused by SRS, thereby reducing deterioration in an optical power and a signal-to-noise ratio of the wavelength channel, reducing bit errors of a receiver, and reducing impact on performance of an optical transmission system.

In addition, when the third optical signal is an optical signal whose target wavelength band is in a full-wave state, performance deterioration in a remaining wavelength channel can be further reduced.

In an optional manner, that the power change on the at least one wavelength channel is greater than the power change threshold indicates a wave drop state or a wave add state, the wave drop state is a state in which the at least one wavelength channel changes from having a wave to having no wave, and the wave add state is a state in which the at least one wavelength channel changes from having no wave to having a wave.

For example, a pilot signal having a plurality of pilot frequencies is modulated on wavelength channels of the second optical signal that carry service information, and the plurality of pilot frequencies respectively correspond to a plurality of wavelength channels. The method further includes: determining that a wavelength channel corresponding to the at least one pilot frequency is in the wave drop state after it is detected that at least one pilot frequency is switched from a signal non-lost state to a signal lost state; or determining that a wavelength channel corresponding to the at least one pilot frequency is in the wave add state after it is detected that at least one pilot frequency is switched from a signal lost state to a signal non-lost state.

In an example, the adjusting, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal includes: after it is determined that a first wavelength channel of the second optical signal is in the wave drop state, controlling a first wavelength channel of the first optical signal to be switched on, and controlling the first wavelength channel of the second optical signal to be switched off; or after it is determined that a first wavelength channel of the second optical signal is in the wave add state, controlling a first wavelength channel of the first optical signal to be switched off, and controlling the first wavelength channel of the second optical signal to be switched on, where a wavelength of the first wavelength channel of the first optical signal is equal to that of the first wavelength channel of the second optical signal.

Optionally, the controlling a first wavelength channel of the first optical signal to be switched on includes: performing first filtering processing on the first wavelength channel to make the first wavelength channel switched on, where the wavelength of the first wavelength channel that is switched on falls within a band-pass filtering range; and the controlling the first wavelength channel of the second optical signal to be switched off includes: performing second filtering processing on the first wavelength channel to make the first wavelength channel switched off, where the wavelength of the first wavelength channel that is switched off falls within a band-stop filtering range.

Optionally, the adjusting, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal includes: replacing the first wavelength channel of the second optical signal with the first wavelength channel of the first optical signal, or replacing the first wavelength channel of the first optical signal with the first wavelength channel of the second optical signal. The wavelength of the first wavelength channel of the second optical signal is equal to that of the first wavelength channel of the first optical signal. The first wavelength channel of the second optical signal is one or more of the at least one wavelength channel corresponding to the detected power change greater than the threshold.

Optionally, the method further includes: detecting power information of at least two optical transmission nodes; and performing, based on the power information of the at least two optical transmission nodes, optical amplifier gain control on at least two target wavelength bands corresponding to the at least two optical transmission nodes.

For example, a process of performing, based on the power information of the at least two optical transmission nodes, optical amplifier gain control on the at least two target wavelength bands corresponding to the at least two optical transmission nodes includes: calculating a power change value of each of the at least two optical transmission nodes based on the instantaneous power values of the at least two optical transmission nodes; and performing optical amplifier gain control on the at least two target wavelength bands based on the power change value of each optical transmission node.

For example, it is assumed that the optical transmission system has one or more optical transmission structures, where a first optical transmission structure is one of the one or more optical transmission structures, the first optical transmission structure includes Q optical transmission nodes, and $Q \geq 2$, for example, $2 \leq Q \leq 3$. For the optical transmission structure, a power change value of each of Q target wavelength bands is determined based on a stimulated Raman scattering effect model and an instantaneous power value of an optical power of each of the Q target wavelength bands; and based on the determined power change value of each of the Q target wavelength bands, gain control is separately performed on optical amplifiers corresponding to the Q target wavelength bands. For example, power changes caused by a stimulated Raman scattering effect are inversely compensated, so that performance of the system is more stable.

According to a fifth aspect, an optical signal control method is provided. The method includes: detecting power information of at least two optical transmission nodes; and performing, based on the power information of the at least two optical transmission nodes, optical amplifier gain control on at least two target wavelength bands corresponding to the at least two optical transmission nodes.

Optionally, a process of performing, based on the power information of the at least two optical transmission nodes, optical amplifier gain control on at least two target wavelength bands corresponding to the at least two optical transmission nodes includes: calculating a power change value of each of the at least two optical transmission nodes based on the instantaneous power values of the at least two optical transmission nodes; and performing optical amplifier gain control on the at least two target wavelength bands based on the power change value of each optical transmission node.

For example, it is assumed that an optical transmission system has one or more optical transmission structures, where a first optical transmission structure is one of the one or more optical transmission structures, the first optical transmission structure includes Q optical transmission nodes, and Q≥2, for example, 2≤Q≤3. A power change value of each of Q target wavelength bands is determined based on a stimulated Raman scattering effect model and an instantaneous power value of an optical power of each of the Q target wavelength bands; and based on the determined power change value of each of the Q target wavelength bands, gain control is separately performed on optical amplifiers corresponding to the Q target wavelength bands. For example, power changes caused by a stimulated Raman scattering effect are inversely compensated, so that performance of the system is more stable.

According to a sixth aspect, this application provides an optical signal control apparatus. The optical signal control apparatus may include at least one module. The at least one module may be configured to implement the optical signal control method provided in any one of the fourth aspect or the possible implementations of the fourth aspect, and/or implement the optical signal control method provided in any one of the fifth aspect or the possible implementations of the fifth aspect.

According to a seventh aspect, this application provides a computer device. The computer device includes a processor and a memory. The memory stores computer instructions. The processor executes the computer instructions stored in the memory, so that the computer device performs the optical signal control method provided in any one of the fourth aspect or the possible implementations of the fourth aspect, and/or performs the optical signal control method provided in any one of the fifth aspect or the possible implementations of the fifth aspect.

According to an eighth aspect, this application provides a computer-readable storage medium. The computer-readable storage medium stores computer instructions. The computer instructions instruct a computer device to perform the optical signal control method provided in any one of the fourth aspect or the possible implementations of the fourth aspect, and/or to perform the optical signal control method provided in any one of the fifth aspect or the possible implementations of the fifth aspect.

According to a ninth aspect, this application provides a computer program product. The computer program product includes computer instructions, and the computer instructions are stored in a computer-readable storage medium. A processor of a computer device may read the computer instructions from the computer-readable storage medium. The processor executes the computer instructions, so that the computer device performs the optical signal control method provided in any one of the fourth aspect or the possible implementations of the fourth aspect, and/or performs the optical signal control method provided in any one of the fifth aspect or the possible implementations of the fifth aspect.

According to a tenth aspect, a chip is provided. The chip may include a programmable logic circuit and/or program instructions. When the chip runs, the programmable logic circuit and/or program instructions are/is used for implementing the optical signal control method provided in any one of the fourth aspect or the possible implementations of the fourth aspect, and/or implementing the optical signal control method provided in any one of the fifth aspect or the possible implementations of the fifth aspect.

In summary, after the detection module detects that the power change of the second optical signal on the at least one wavelength channel is greater than the power change threshold, the optical signal control apparatus, the optical transmission node, and the optical transmission system that are provided in embodiments of this application adjust the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great (for example, the wavelength channel is in a wave add state or a wave drop state), the wavelength channel of the second optical signal whose power change is great is replaced with a corresponding wavelength channel of the first optical signal, to obtain the third optical signal. A power of the third optical signal is stable. This can reduce the wavelength channel combination change of the target wavelength band, and reduce the gain change of each wavelength channel in the optical amplifier and the optical power change of each wavelength channel caused by SRS, thereby reducing the deterioration in the optical power and the signal-to-noise ratio of the wavelength channel, reducing the bit errors of the receiver, and reducing the impact on performance of the optical transmission system.

In addition, when the third optical signal is the optical signal whose target wavelength band is in the full-wave state, the performance deterioration in the remaining wavelength channel can be further reduced.

The optical signal control apparatus provided in this embodiment of this application is disposed outside the WSS in the optical transmission node. No additional port of the WSS device needs to be occupied, so that the structure of the WSS in the optical transmission node is simplified, and the manufacturing costs of the WSS are reduced. In addition, because the structure of the optical signal control apparatus is simplified compared with that of the conventional WSS, the optical signal control apparatus can implement quick replacement between the dummy light and the true wave signal, and the replacement speed is increased from a conventional second level to a millisecond level. This reduces the possible service interruption time, or controls the service interruption duration to be less than or equal to 50 ms, to implement the unperceivable interruption delay for the upper-layer service.

DETAILED DESCRIPTION OF ILLUSTRATIVE EMBODIMENTS

To make principles and technical solutions of this application clearer, the following further describes implementations of this application in detail with reference to the accompanying drawings.

Figure 1:
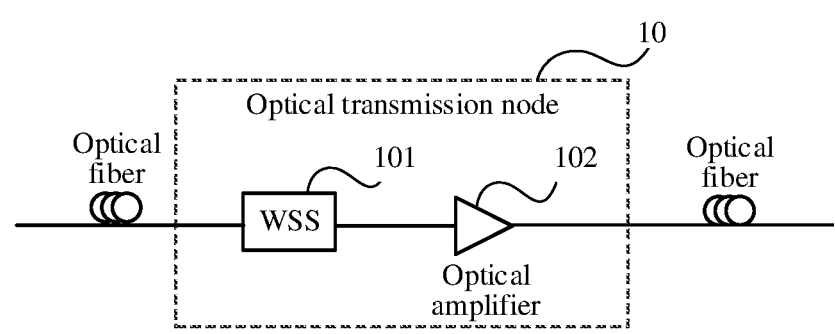
FIG. 1 is a schematic diagram of an application environment of an optical transmission system in which an optical signal control apparatus is located according to an embodiment of this application.
Figure 2:
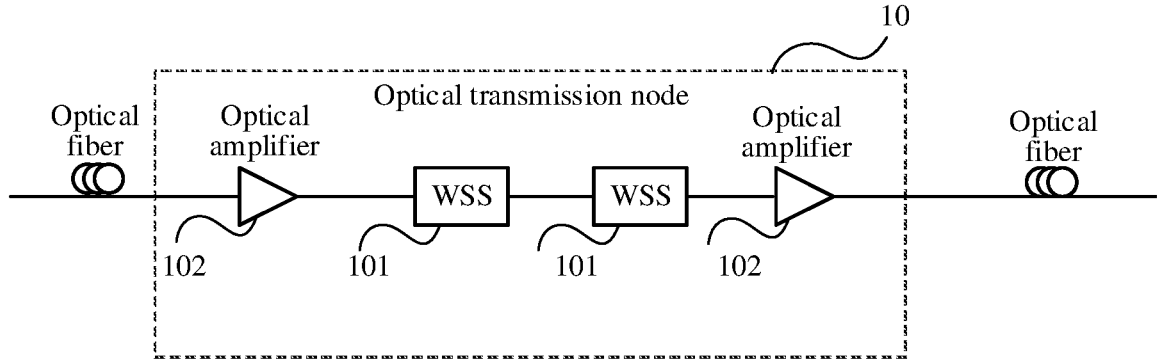
FIG. 2 is a schematic diagram of an application environment of an optical transmission system in which another optical signal control apparatus is located according to an embodiment of this application.

Optical fiber (also referred to as a line fiber) communication is a communication mode in which an optical signal is used as an information carrier and an optical fiber is used as a transmission medium. The optical fiber communication has advantages such as a wide transmission frequency band, high immunity to interference, and low signal attenuation. FIG. 1 and FIG. 2 are schematic diagrams of application environments of optical transmission systems (also referred to as optical fiber communication systems) in which optical signal control apparatuses are located according to embodiments of this application. The optical transmission system is based on optical fiber communication, and includes one or more optical transmission nodes. The optical transmission node may include at least one optical component, for example, an optical amplifier. In FIG. 1, it is assumed that the optical transmission system includes one optical transmission node 10, and the optical transmission node 10 includes a wavelength selective switch (WSS) 101 and an optical amplifier 102. In FIG. 2, it is assumed that the optical transmission system includes one optical transmission node 10, and the optical transmission node 10 includes two WSSs 101 and two optical amplifiers 102. A quantity and types of optical components included in the optical transmission system are not limited in embodiments of this application. The optical transmission systems in FIG. 1 and FIG. 2 may transmit service information according to a wavelength division multiplexing (WDM) technology by using an optical signal, where the service information is modulated on different wavelength channels.

Figure 3A:
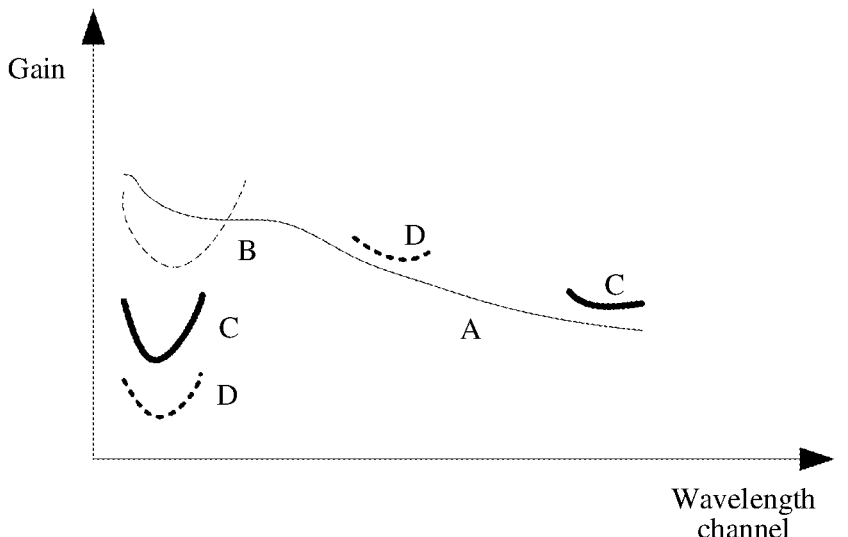
FIG. 3A is a schematic diagram of gain changes of optical amplifiers for different wavelength channels according to an embodiment of this application.

Because wavelength channels of an optical signal affect each other, if a power change of the wavelength division multiplexing optical signal on a wavelength channel is great, for example, if the wavelength channel is in a wave drop state or a wave add state, optical transmission performance of a remaining wavelength channel deteriorates under the actions of, for example, stimulated Raman scattering effects of an optical amplifier and an optical fiber in the optical transmission system. FIG. 3A is a schematic diagram of gain changes of wavelength channels in an optical amplifier according to an embodiment of this application. In FIG. 3A, a horizontal axis represents a wavelength channel, and a vertical axis represents a gain. As shown in FIG. 3A, gains of the wavelength channels in the optical amplifier usually affect each other, and gains of different wavelength channels are affected by gain competition between the wavelength channels. It is assumed that a gain curve is a curve A when a target wavelength band is in a full-wave state. Curves B, C and D are gain curves of remaining wavelength channels when a combination of three different wavelength channels in the target wavelength band changes (for example, some wavelength channels change from a state of having a wave to a state of having no wave or change from a state of having no wave to a state of having a wave). The target wavelength band is a preset service wavelength band, and the full-wave state means that powers of all specified wavelength channels (these wavelength channels are used to carry service information) in the target wavelength band are all greater than a preset power threshold. In other words, all the wavelength channels have a wave, that is, have an optical signal. The optical signal may be an optical signal that carries service information or an optical signal that does not carry service information. For example, if the target wavelength band is a C wavelength band, an optical wavelength range of the C wavelength band is from 1530 nm (nanometer) to 1565 nm, and there are 80 specified wavelength channels in the C wavelength band, the C wavelength band is in a full-wave state when all the 80 wavelength channels have a wave. It can be learned from FIG. 3A that the gain curve corresponding to the target wavelength band in the full-wave state is smooth. When a power change on a wavelength channel is greater than a power change threshold, gain curves change obviously, and a deviation between the gain curves of the remaining wavelength channels and the gain curve in the full-wave state is large.

Figure 3B:
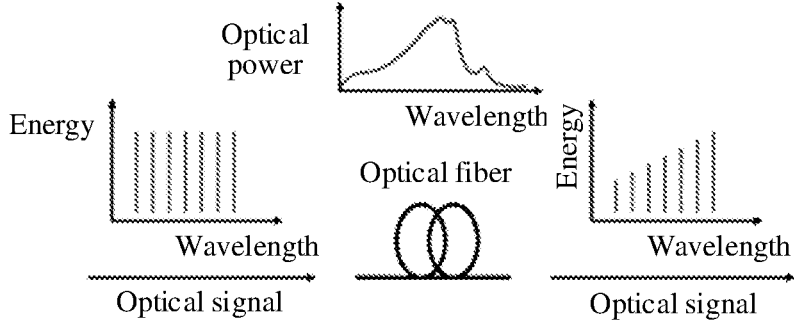
FIG. 3B is a schematic diagram of an application principle of a stimulated Raman scattering effect in an optical transmission system according to an embodiment of this application.

FIG. 3B is a schematic diagram of an application principle of a stimulated Raman scattering effect in an optical transmission system according to an embodiment of this application. The stimulated Raman scattering effect means that after optical signals are transmitted through an optical fiber, energy of a short-wavelength optical signal is transferred to that of a long-wavelength optical signal, and finally spectral distribution with specific inclination in which the short-wavelength optical signal has a low optical power and the long-wavelength optical signal has a high optical power is formed. When a wavelength band of the optical transmission system is a C+L wavelength band, the power transfer caused by the stimulated Raman scattering effect is more severe.

Affected by the gain competition between the wavelength channels in the optical amplifier and the stimulated Raman scattering effect, once the wavelength channel combination of the target wavelength band changes, a gain and an optical power of each wavelength channel in the optical amplifier also change drastically. Such drastic changes may cause excessively high or low gains and optical powers of some wavelength channels. After being transmitted through multi-fiber spans and a plurality of optical amplifiers, optical powers and signal-to-noise ratios of these wavelength channels seriously deteriorate, thereby causing a receiver to generate bit errors, and seriously affecting performance of the optical transmission system.

For example, in the optical transmission system, an initially transmitted wavelength division multiplexing optical signal is an optical signal in a C wavelength band with 80 wavelength channels, and the 80 wavelength channels are wavelength channels 1 to 80. During transmission, wavelength channels 1 to 40 are in a wave drop state. Affected by the gain competition between the wavelength channels in the optical amplifier, gains of remaining wavelength channels 41 to 80 are no longer balanced by the previous wavelength channels 1 to 40. As a result, the original gains corresponding to the C wavelength band in the full-wave state change greatly. In addition, if the C wavelength band is in the full-wave state because of the stimulated Raman scattering effect, the wavelength channels 41 to 80 absorb energy from the wavelength channels 1 to 40, but once a wave drop occurs on the wavelength channels 1 to 40, the remaining wavelength channels 41 to 80 cannot absorb energy from the wavelength channels 1 to 40. As a result, the original optical power corresponding to the C wavelength band in the full-wave state drops greatly. Therefore, optical transmission performance of the wavelength channels 41 to 80 deteriorates obviously because of the foregoing two aspects.

An embodiment of this application provides an optical signal control apparatus, which may be disposed in the optical transmission system to control an on/off state of a wavelength channel, to reduce optical transmission performance deterioration in a remaining wavelength channel caused by a change of the wavelength channel.

Figure 4:
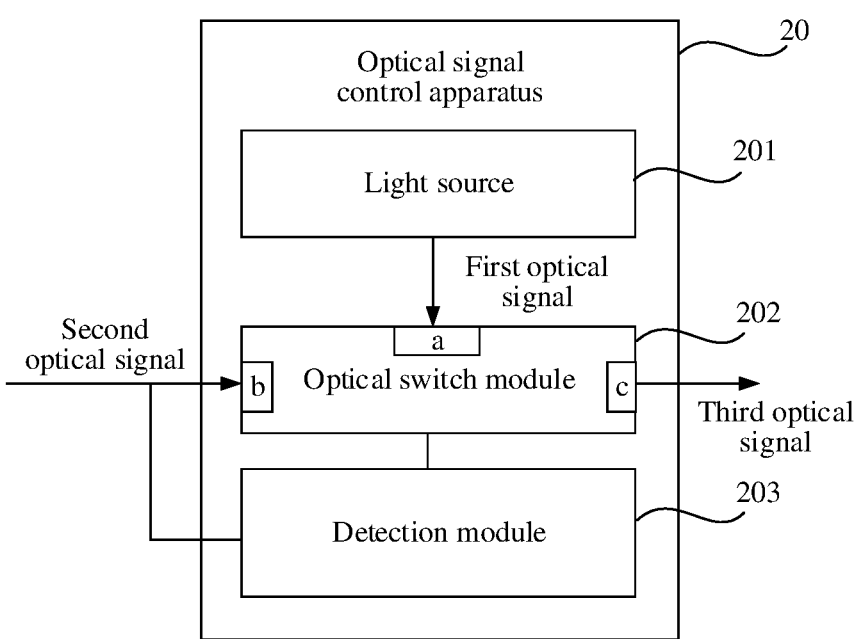
FIG. 4 is a schematic diagram of a structure of an optical signal control apparatus according to an embodiment of this application.

FIG. 4 is a schematic diagram of a structure of an optical signal control apparatus 20 according to an embodiment of this application. The optical signal control apparatus 20 is configured to control different wavelength channels of a first optical signal inside the apparatus and a second optical signal outside the apparatus in a target wavelength band. The apparatus 20 can be used in the optical transmission system shown in FIG. 1 or FIG. 2, and the apparatus 20 includes a light source 201, an optical switch module 202, and a detection module 203.

The light source 201 is configured to output the first optical signal. The first optical signal is usually an optical signal that does not carry service information and may be referred to as dummy light. The target wavelength band corresponding to the optical signal control apparatus is preset. A wavelength band of the first optical signal output by the light source 201 is usually greater than or equal to the target wavelength band, that is, the light source is a wide spectrum light source, and a wavelength band of the light source covers the target wavelength band. In this way, subsequent control on each wavelength channel of the first optical signal in the target wavelength band can be ensured.

The optical switch module 202 has a first input end a, a second input end b, and an output end c, the first input end a is configured to receive the first optical signal, the second input end b is configured to receive the external second optical signal, and the output end c is configured to output a third optical signal, for example, output the third optical signal to a main line of an optical link. The external second optical signal is an optical signal from outside the optical signal control apparatus 20, namely, an optical signal received by the optical signal control apparatus 20 from the optical link of the optical transmission system in which the optical signal control apparatus 20 is located, and the optical link is a link for transmitting an optical signal, for example, an optical fiber. The second optical signal is usually an optical signal that carries service information and may be referred to as a true wave signal.

The detection module 203 is configured to detect whether the second optical signal exists, for example, whether a power change of the second optical signal on at least one wavelength channel is greater than a preset power change threshold. It should be noted that, when detecting that there is no wavelength channel on which the power change of the second optical signal is greater than the preset power change threshold, the detection module 203 performs next detection.

That the power change on the at least one wavelength channel is greater than the preset power change threshold indicates a wave drop state or a wave add state, the wave drop state is a state in which the at least one wavelength channel changes from having a wave (that is, having an optical signal) to having no wave (that is, having no optical signal), and the wave add state is a state in which the at least one wavelength channel changes from having no wave to having a wave. For example, the target wavelength band is a C wavelength band, and there are 80 specified wavelength channels in the target wavelength band in a full-wave state. If the at least one wavelength channel is in the wave drop state, a quantity of specified wavelength channels in a state of having a wave decreases and is less than 80. If the at least one wavelength channel is in the wave add state, a quantity of specified wavelength channels in a state of having a wave increases and is less than or equal to 80.

The optical switch module 202 is configured to: after the detection module detects that the power change on the at least one wavelength channel is greater than the power change threshold, adjust on/off states of at least one wavelength channel of the received first optical signal and the at least one wavelength channel of the received second optical signal, so that an adjusted first optical signal and an adjusted second optical signal are combined to obtain the third optical signal.

Adjusting the on/off states of the at least one wavelength channel of the received first optical signal and the at least one wavelength channel of the received second optical signal means changing the on/off states of the at least one wavelength channel of the first optical signal and the at least one wavelength channel of the second optical signal. For example, after the detection module 203 determines that a wavelength channel Ξ1 of the second optical signal changes from a state of having no wave to a state of having a wave, a wavelength channel λ1 of the first optical signal is adjusted to be in an off state if an original on/off state of the wavelength channel λ1 of the first optical signal is an on state, and the wavelength channel λ1 of the second optical signal is adjusted to be in an on state if an original on/off state of the wavelength channel λ1 of the second optical signal is an off state. In this way, a wavelength channel λ1 of the output third optical signal is in a state of having a wave, and the optical signal is an optical signal on the wavelength channel λ1 of the second optical signal. For another example, after the detection module 203 determines that a wavelength channel λ1 of the second optical signal changes from a state of having a wave to a state of having no wave, a wavelength channel λ1 of the first optical signal is adjusted to be in an on state if an original on/off state of the wavelength channel λ1 of the first optical signal is an off state, and the wavelength channel λ1 of the second optical signal is adjusted to be in an off state if an original on/off state of the wavelength channel λ1 of the second optical signal is an on state. In this way, a wavelength channel λ1 of the output third optical signal is in a state of having a wave, and the optical signal is an optical signal on the wavelength channel λ1 of the first optical signal. It can be learned from the foregoing that, because the on/off states of the at least one wavelength channel of the first optical signal and the at least one wavelength channel of the second optical signal are adjusted, a power change and a gain change of at least one wavelength channel of the third optical signal obtained through combination can be compensated relative to the second optical signal. This ensures that a wavelength channel combination of the target wavelength band is kept unchanged or slightly changed.

In summary, after the detection module detects that the power change of the second optical signal on the at least one wavelength channel is greater than the power change threshold, the optical switch module of the optical signal control apparatus provided in this embodiment of this application adjusts the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great (for example, the wavelength channel is in a wave add state or a wave drop state), the second optical signal is updated to the third optical signal for output. This effectively reduces optical transmission performance deterioration in a remaining wavelength channel caused by the power change on the at least one wavelength channel.

In this embodiment of this application, the detection module 203 may detect the wave drop state or the wave add state by detecting a pilot signal. In an optional example, a pilot signal having a plurality of pilot frequencies is modulated on wavelength channels of the second optical signal that carry service information. For example, when a transmitter transmits the second optical signal, the pilot signal having the plurality of pilot frequencies is modulated on the optical signal (namely, a true wave signal) that carries service information, and the plurality of pilot frequencies respectively correspond to a plurality of wavelength channels, for example, are in a one-to-one correspondence with a plurality of specified wavelength channels in a target wavelength band. Optionally, when the transmitter transmits the second optical signal, no pilot signal is modulated on an optical signal (namely, dummy light) that does not carry service information. A frequency refers to an absolute frequency value, and is a specified center frequency of a modulated signal. In this embodiment of this application, the plurality of pilot frequencies are different from each other. For example, the plurality of pilot frequencies include 1 MHz or 10 MHz. In this way, the detection module 203 can effectively identify the pilot frequencies.

Figure 5:
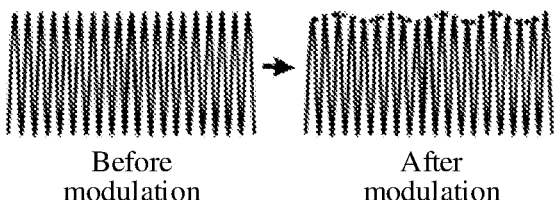
FIG. 5 is a schematic diagram illustrating that a pilot signal having a plurality of pilot frequencies is modulated on a second optical signal by a transmitting end.

FIG. 5 is a schematic diagram illustrating that a pilot signal having a plurality of pilot frequencies is modulated on a second optical signal by a transmitting end. For example, it is assumed that all wavelength channels of the second optical signal, namely, a true wave signal, carry service information. The pilot signal may be a low-frequency pilot signal, and a frequency of the pilot signal is less than a preset frequency threshold. The frequency threshold may be 10 MHz. During sending of the second optical signal, modulating the low-frequency pilot signal can implement modulation of the second optical signal. Tops of optical waves corresponding to the second optical signal before modulation are flush with each other, that is, heights of wave peaks are equal to each other. Tops of optical waves corresponding to a modulated second optical signal are no longer flush with each other, that is, fluctuation is formed.

The detection module 203 is configured to detect the pilot signal. For example, the detection module 203 may be a detection circuit.

The optical switch module 202 is configured to: after the detection module 203 detects that at least one pilot frequency is switched from a signal non-lost state (that is, there is a signal) to a signal lost state (a signal loss, that is, there is no signal), determine that a wavelength channel corresponding to the at least one pilot frequency is in the wave drop state; or after the detection module 203 detects that at least one pilot frequency is switched from a signal lost state to a signal non-lost state, determine that a wavelength channel corresponding to the at least one pilot frequency is in the wave add state. For example, the detection module 203 may periodically detect statuses of a pilot frequency, and determine, based on statuses of the pilot frequency in each two adjacent detection periods, whether status switching occurs in the pilot frequency. When a status of the pilot frequency in a current detection period is a signal non-lost state, and a status of the pilot frequency in a previous detection period is a signal lost state, it is determined that the pilot frequency is switched from the signal lost state to the signal non-lost state. When a status of the pilot frequency in a current detection period is a signal lost state, and a status of the pilot frequency in a previous detection period is a signal non-lost state, it is determined that the pilot frequency is switched from the signal non-lost state to the signal lost state. During actual implementation, when the status of the pilot frequency in the current detection period is the signal lost state, alternatively, it may be directly determined that the pilot frequency is in the signal lost state without detecting whether the status of the pilot frequency in the previous detection period is the signal lost state.

Figure 6:
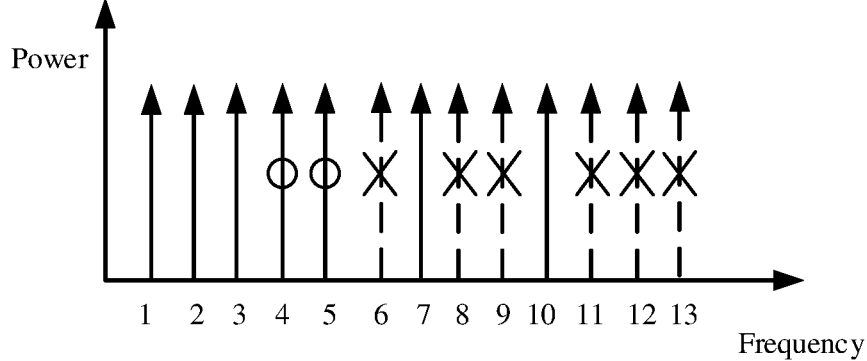
FIG. 6 is a schematic diagram of example pilot frequency detection according to an embodiment of this application.

FIG. 6 is a schematic diagram of example pilot frequency detection according to an embodiment of this application. In FIG. 6, a horizontal axis represents a frequency, a vertical axis represents a power, and 1 to 13 are numbers of corresponding pilot frequencies but do not represent frequency values. In FIG. 6, solid-line arrows with circles indicate that pilot frequencies are switched from the signal lost state to the signal non-lost state, dashed-line arrows with crosses indicate that pilot frequencies are switched from the signal non-lost state to the signal lost state, and other solid-line arrows indicate that status switching does not occur in pilot frequencies. It can be learned from FIG. 6 that pilot frequencies numbered 6, 8, 9, 11, 12, and 13 are switched from the signal non-lost state to the signal lost state, and then it indicates that wavelength channels corresponding to the pilot frequencies numbered 6, 8, 9, 11, 12, and 13 are in the wave drop state. Pilot frequencies numbered 4 and 5 are switched from the signal lost state to the signal non-lost state, and then it indicates that wavelength channels corresponding to the pilot frequencies numbered 4 and 5 are in the wave add state.

It should be noted that, because the pilot signal having the plurality of pilot frequencies has been modulated on the wavelength channels that are of the second optical signal received by the optical signal control apparatus 20 and that carry the service information, in an optional implementation, the pilot signal is still modulated on wavelength channels that are of the third optical signal output by the optical signal control apparatus 20 and that carry service information. Assuming that a wavelength channel $\lambda 2$ of the third optical signal does not carry service information, that is, the third optical signal is dummy light, the pilot signal is not modulated on the wavelength channel $\lambda 2$, and the optical signal control apparatus 20 does not modulate the pilot signal for the wavelength channel $\lambda 2$. A status of a pilot frequency corresponding to the wavelength channel $\lambda 2$ is detected as a signal lost state in a subsequent detection process.

Figure 7:
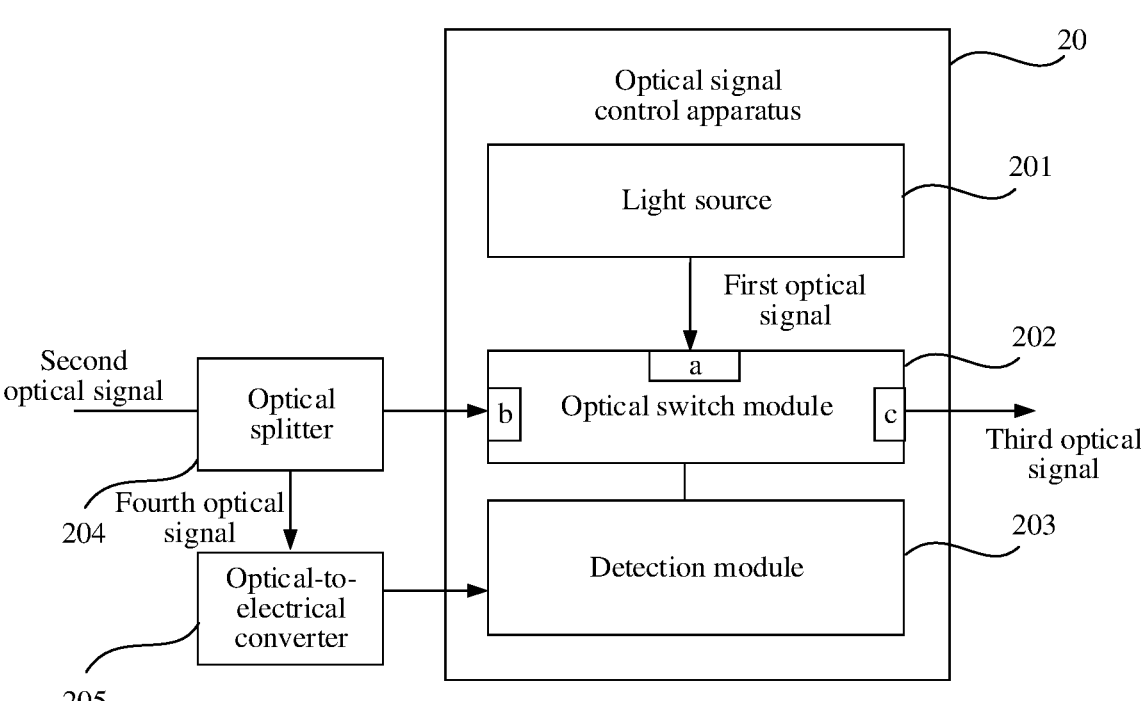
FIG. 7 is a schematic diagram of a structure of another example optical signal control apparatus according to an embodiment of this application.

In this embodiment of this application, the detection module 203 may detect the pilot signal in a plurality of manners. FIG. 7 is a schematic diagram of a structure of another example optical signal control apparatus 20 according to an embodiment of this application. As shown in FIG. 7, the optical signal control apparatus 20 further includes an optical splitter 204 and an optical-to-electrical converter 205.

The optical splitter 204 is configured to split the second optical signal into a fourth optical signal with a partial power, and the optical splitter 204 may be disposed on an optical link for transmitting the second optical signal. The optical splitter 204 has one input end and two output ends, and splits the second optical signal input from the input end into two channels: the fourth optical signal and a new second optical signal. A power of the new second optical signal is reduced compared with a power of the second optical signal input to the optical splitter, but an amount of carried service information is not reduced. In this process, the split part of the second optical signal is used for pilot signal detection. For example, a ratio of the power of the fourth optical signal to the power of the second optical signal ranges from 1% to 10%, for example, the ratio of the power of the fourth optical signal to the power of the second optical signal is 5%. This can ensure that optical signal splitting has small impact on the power of the second optical signal.

The optical-to-electrical converter 205 is configured to convert the fourth optical signal into an electrical signal, and output the converted electrical signal to the detection module 203. For example, the optical-to-electrical converter 205 may be a photodiode (PD). The optical-to-electrical converter 205 is a conversion device adapted to the pilot signal. For example, if the pilot signal is a low-frequency pilot signal, the optical-to-electrical converter 205 is a conversion device configured to detect the low-frequency pilot signal, and may convert the detected low-frequency pilot signal into an electrical signal.

Figure 8:
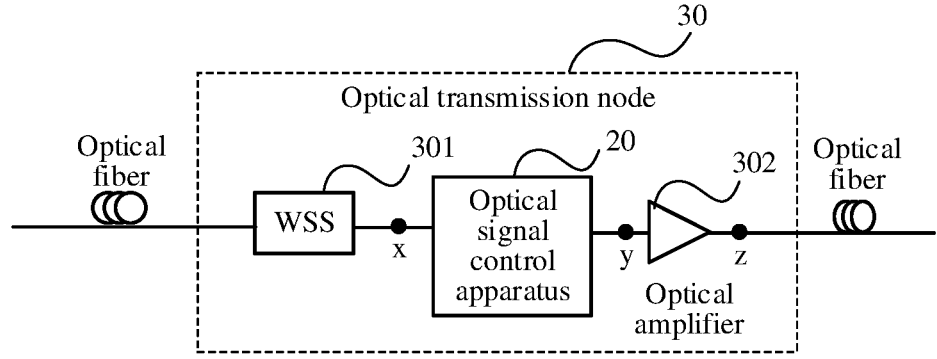
FIG. 8 is a schematic diagram of a structure of an optical transmission node in which an optical signal control apparatus is located according to an embodiment of this application.

FIG. 8 is a schematic diagram of a structure of an optical transmission node 30 in which an optical signal control apparatus 20 is located according to an embodiment of this application. The optical transmission node 30 includes a WSS 301 and an optical amplifier 302. It is assumed that the optical signal control apparatus 20 is disposed between the WSS 301 and the optical amplifier 302. An input end of the detection module 203 (namely, a detection end) may be connected to an output end x of the WSS 301, namely, a multiplexing port of the WSS 301. In an optional implementation, the detection module 203 further includes at least one other input end, and the at least one other input end is connected to at least one of an output end y of the optical signal control apparatus 20 or an output end z of the optical amplifier 302.

The output end y of the optical signal control apparatus 20 is an output end c of the third optical signal. When the other input ends of the detection module 203 are connected to the output end y, the detection module 203 may further detect a relationship between optical signals that are obtained from the output end x and the output end y, determine, based on the relationship between the optical signals, whether the optical signal control apparatus is faulty, and when determining that the optical signal control apparatus 20 is faulty, send alarm information indicating that the optical signal control apparatus is faulty. For example, based on the optical signals obtained from the output end x and the output end y through detection, it can be learned that when the power change of the second optical signal on the at least one wavelength channel is greater than the preset power change threshold, the optical switch module does not perform optical signal adjustment or an adjustment problem occurs.

When the other input ends of the detection module 203 are connected to both the output end y and the output end z, the detection module 203 may further detect a relationship between optical signals that are obtained from the output end y and the output end z, determine, based on the relationship between the optical signals, whether the optical amplifier 302 is faulty, and when determining that the optical amplifier 302 is faulty, send alarm information indicating that the optical amplifier is faulty. For example, based on the optical signals obtained from the output end y and the output end z through detection, it can be learned that the optical amplifier does not perform signal amplification or a signal amplification ratio is less than a preset ratio.

When the other input ends of the detection module 203 are connected to the output end z, the detection module 203 may further detect a relationship between optical signals that are obtained from the output end x and the output end z, determine, based on the relationship between the optical signals, whether the optical amplifier 302 is faulty, and when determining that the optical amplifier 302 is faulty, send alarm information indicating that the optical amplifier is faulty. For example, based on the optical signals obtained from the output end x and the output end z through detection, it can be learned that the optical amplifier does not perform signal amplification or a signal amplification ratio is less than a preset ratio.

A function of the optical transmission node can be calibrated in time by detecting the output end y and/or the output end z, to avoid service interruption or a transmission error caused by a fault of an optical component in the optical transmission node. It should be noted that the detection module 203 may be further integrated with another detection function. Details are not described in this embodiment of this application.

Figure 9:
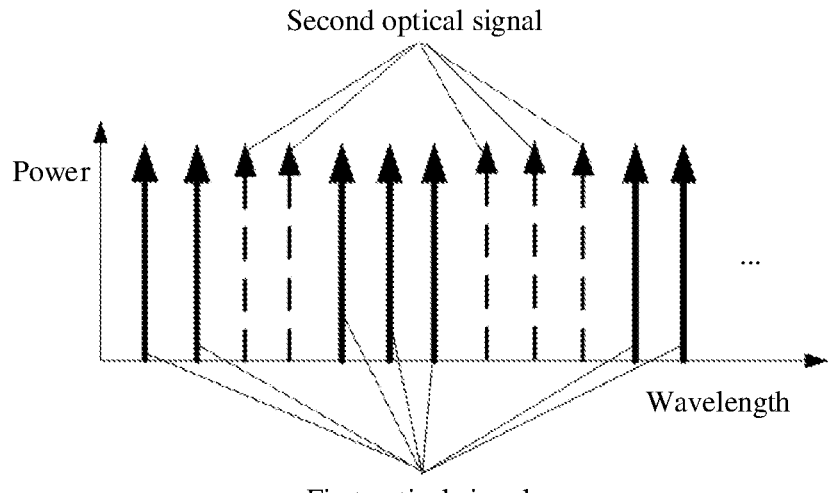
FIG. 9 is a schematic diagram of a principle of wavelength channel control according to an embodiment of this application.

As described above, if a power change of the wavelength division multiplexing optical signal on a wavelength channel is great, for example, if the wavelength channel is in a wave drop state or a wave add state, ensuring that the wavelength channel combination of the optical transmission system does not change can effectively ensure performance stability of the remaining wavelength channel. FIG. 9 is a schematic diagram of a principle of wavelength channel control according to an embodiment of this application. In FIG. 9, dashed-line arrows indicate wavelength channels of the second optical signal, and solid-line arrows indicate wavelength channels of the first optical signal. The optical switch module 202 is configured to fill specified wavelength channels in the target wavelength band with the first optical signal or the second optical signal, to make, as much as possible, the wavelength channel combination of the optical transmission system unchanged or slightly changed, for example, to make the target wavelength band satisfy a preset state such as a full-wave state. It is assumed that a first wavelength channel of the second optical signal is one or more of the at least one wavelength channel corresponding to the detected power change greater than the threshold. According to the principle in FIG. 9, it can be learned that the optical switch module 202 may be configured to implement mutual replacement between a first wavelength channel of the first optical signal and the first wavelength channel of the second optical signal. The mutual replacement process includes: replacing the first wavelength channel of the second optical signal with the first wavelength channel of the first optical signal (that is, filling the first wavelength channel of the first optical signal into the first wavelength channel of the second optical signal), or replacing the first wavelength channel of the first optical signal with the first wavelength channel of the second optical signal (that is, keeping the first wavelength channel of the second optical signal in an on state and switching off the first wavelength channel of the first optical signal). A wavelength of the first wavelength channel of the second optical signal is equal to that of the first wavelength channel of the first optical signal. In this way, a wavelength channel combination of the final output third optical signal can be made unchanged relative to the second optical signal (that is, a second optical signal before a wave add or a wave drop) that is present before inputting to the optical switch module 202.

In a first case, the optical switch module 202 is configured to: after determining that the first wavelength channel of the second optical signal is in the wave drop state, control the first wavelength channel of the first optical signal received by the first input end a to be switched on, and control the first wavelength channel of the second optical signal received by the second input end b to be switched off. During actual implementation, when the optical switch module 202 determines that the first wavelength channel of the second optical signal is in the wave drop state, because there is no optical signal on the first wavelength channel of the second optical signal, after the optical switch module 202 controls the first wavelength channel of the first optical signal received by the first input end a to be switched on, the optical switch module 202 does not need to control an on/off state of the second optical signal received by the second input end b (that is, does not perform a control action on the on/off state of the second optical signal). For example, the first wavelength channel of the second optical signal is kept in an off state if an original on/off state of the first wavelength channel of the second optical signal is an off state; or the first wavelength channel of the second optical signal is kept in an on state if an original on/off state of the first wavelength channel of the second optical signal is an on state. In this way, a procedure for controlling the on/off states of the wavelength channels can be simplified, and control complexity can be reduced.

In a second case, the optical switch module 202 is configured to: after determining that the first wavelength channel of the second optical signal is in the wave add state, control the first wavelength channel of the first optical signal received by the first input end a to be switched off, and control the first wavelength channel of the second optical signal received by the second input end b to be switched on. The wavelength of the first wavelength channel of the first optical signal is equal to that of the first wavelength channel of the second optical signal.

In this embodiment of this application, the optical switch module 202 may control on/off of a wavelength channel in a filtering manner. For example, the optical switch module 202 is configured to: perform first filtering processing on the first wavelength channel to make the first wavelength channel switched on, where the wavelength of the first wavelength channel that is switched on falls within a band-pass filtering range; and perform second filtering processing on the first wavelength channel to make the first wavelength channel switched off, where the wavelength of the first wavelength channel that is switched off falls within a band-stop filtering range.

The first filtering processing and the second filtering processing are opposite filtering processing, and have a plurality of implementations. The following two implementations are used as examples for description in this embodiment of this application.

In a first implementation, the first filtering processing and the second filtering processing are overall filtering processing loaded on an optical signal. It is assumed that the first wavelength channel is a first wavelength channel of any optical signal M in the first optical signal and the second optical signal. A process of performing the first filtering processing on the first wavelength channel to make the first wavelength channel switched on includes: loading a first filtering curve for the optical signal M, where a filtering characteristic of the first filtering curve on the first wavelength channel is a switch-on characteristic, and a filtering characteristic of the first filtering curve on a wavelength channel other than the first wavelength channel is a switch-off characteristic. A process of performing the second filtering processing on the first wavelength channel to make the first wavelength channel switched off includes: loading a second filtering curve for the optical signal M, where a filtering characteristic of the second filtering curve on the first wavelength channel is a switch-off characteristic, and a filtering characteristic of the second filtering curve on the wavelength channel other than the first wavelength channel is a switch-on characteristic.

Figure 10:
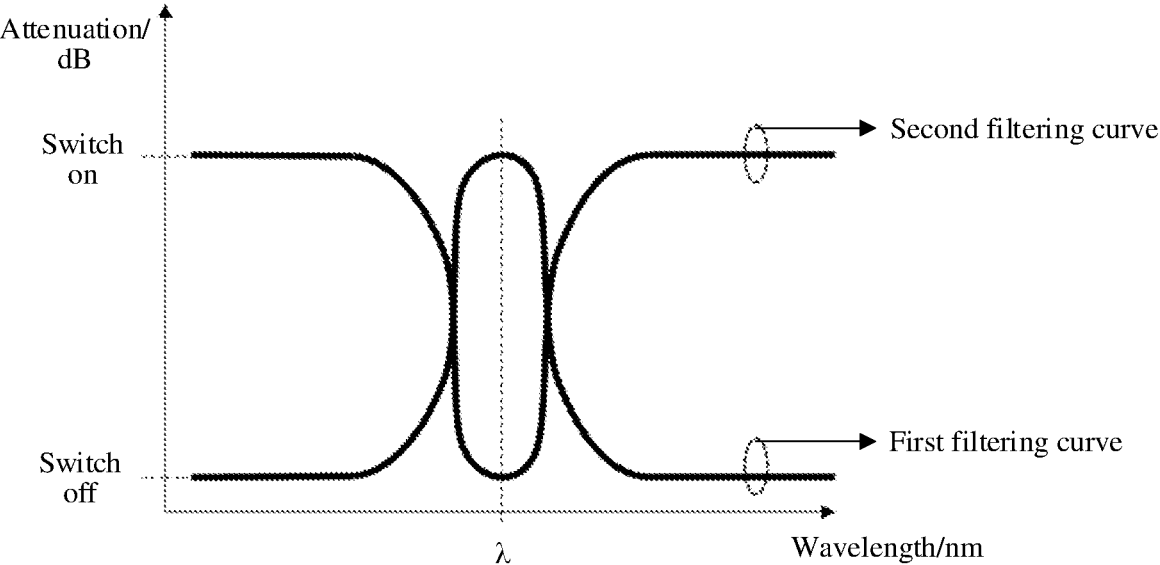
FIG. 10 is a schematic diagram of a first filtering curve and a second filtering curve according to an embodiment of this application.

FIG. 10 is a schematic diagram of a first filtering curve and a second filtering curve according to an embodiment of this application. In FIG. 10, a horizontal axis represents a wavelength measured in nm (nanometer), and a vertical axis represents attenuation measured in dB (decibel). A switch-on characteristic indicates that there is no attenuation or attenuation is less than or equal to a first preset attenuation value. For example, the first preset attenuation value is 1 dB. A switch-off characteristic indicates that attenuation is greater than or equal to a second preset attenuation value. For example, the second preset attenuation value is 35 dB. It is assumed that the wavelength of the first wavelength channel is $\lambda$, and one of a filtering curve loaded for the first wavelength channel of the first optical signal and a filtering curve loaded for the first wavelength channel of the second optical signal at a same moment are one of the first filtering curve and the second filtering curve. For example, after it is determined that the first wavelength channel of the second optical signal is in the wave drop state, the first filtering curve is controlled to be loaded for the first optical signal received by the first input end a, and the second filtering curve is controlled to be loaded for the second optical signal received by the second input end b. After it is determined that the first wavelength channel of the second optical signal is in the wave add state, the second filtering curve is controlled to be loaded for the first optical signal received by the first input end a, and the first filtering curve is controlled to be loaded for the second optical signal received by the second input end b.

In a second implementation, the first filtering processing and the second filtering processing are partial filtering processing loaded on an optical signal. A plurality of grid windows in the target wavelength band are configured in the optical signal control apparatus, such as the optical switch module. The plurality of grid windows include grid windows corresponding to a plurality of specified wavelength channels in the target wavelength band. For a division manner of the plurality of grid windows, refer to a division manner of grid windows of wavelength division multiplexing defined in an International Telecommunication Union Telecommunication Standardization Sector (ITU-T) G.694.1 standard, that is, a center wavelength of each grid window is preset. For example, for a grid window whose center wavelength is 50 GHz, during filtering, only optical signals within a range of the grid window whose center wavelength is 50 GHz are filtered.

It is assumed that the first wavelength channel is a first wavelength channel of any optical signal M in the first optical signal and the second optical signal. A process of performing the first filtering processing on the first wavelength channel to make the first wavelength channel switched on includes: loading a third filtering curve for a grid window corresponding to the first wavelength channel of the optical signal M, where a filtering characteristic of the third filtering curve is a switch-on characteristic. A process of performing the second filtering processing on the first wavelength channel to make the first wavelength channel switched off includes: loading a fourth filtering curve for the grid window corresponding to the first wavelength channel of the optical signal M, where a filtering characteristic of the fourth filtering curve is a switch-off characteristic. It should be noted that wavelength channels of the second optical signal other than the first wavelength channel are generally in an on state. In an optional manner, filtering processing is not performed on the other wavelength channels. In another optional manner, third filtering curves are loaded for grid windows corresponding to the other wavelength channels of the second optical signal, where filtering characteristics of the third filtering curves are switch-on characteristics.

Figure 11:
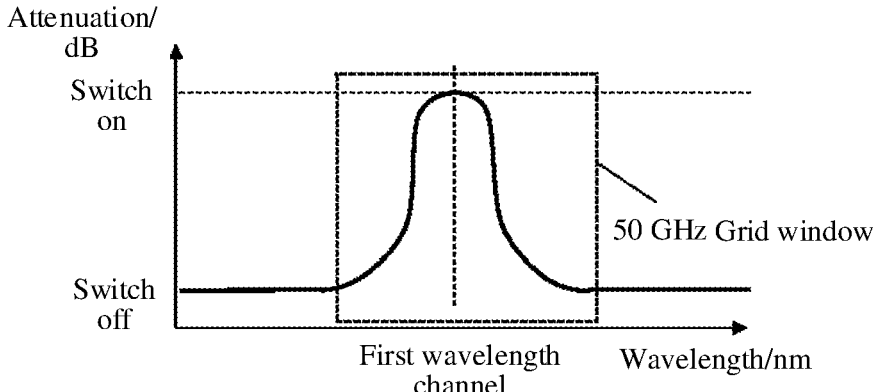
FIG. 11 is a schematic diagram of a third filtering curve and a fourth filtering curve according to an embodiment of this application.
Figure 12:
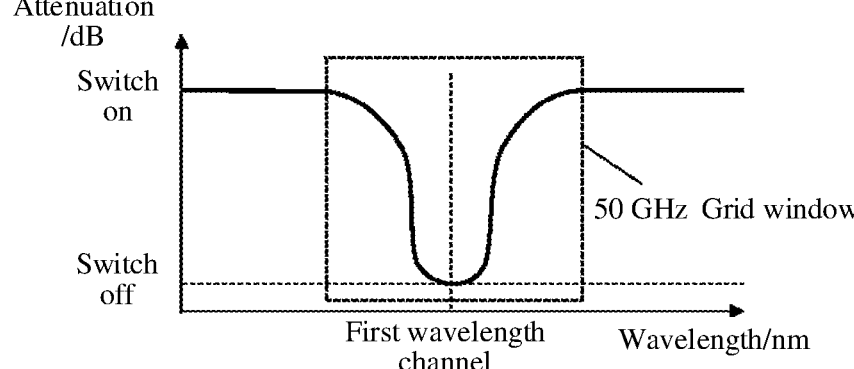
FIG. 12 is a schematic diagram of a third filtering curve and a fourth filtering curve according to an embodiment of this application.

FIG. 11 and FIG. 12 each are a schematic diagram of a third filtering curve and a fourth filtering curve according to embodiments of this application. In FIG. 11 and FIG. 12, a horizontal axis represents a wavelength measured in nm, and a vertical axis represents attenuation measured in dB. A switch-on characteristic indicates that there is no attenuation or attenuation is less than or equal to a first preset attenuation value. For example, the first preset attenuation value is 1 dB. A switch-off characteristic indicates that attenuation is greater than or equal to a second preset attenuation value. For example, the second preset attenuation value is 35 dB. One of a filtering curve loaded for the first wavelength channel of the first optical signal and a filtering curve loaded for the first wavelength channel of the second optical signal at a same moment are one of the third filtering curve and the fourth filtering curve. Assuming that a center wavelength of the first wavelength channel is 50 GHz, the third filtering curve is a curve within a range of the 50 GHz grid window in FIG. 11, and the fourth filtering curve is a curve within a range of the 50 GHz grid window in FIG. 12.

For example, after it is determined that the first wavelength channel of the second optical signal is in the wave drop state, the third filtering curve is controlled to be loaded for a grid window corresponding to the first wavelength channel of the first optical signal received by the first input end a, and the fourth filtering curve is controlled to be loaded for a grid window corresponding to the first wavelength channel of the second optical signal received by the second input end b. After it is determined that the first wavelength channel of the second optical signal is in the wave add state, the fourth filtering curve is controlled to be loaded for the grid window corresponding to the first wavelength channel of the first optical signal received by the first input end a, and the third filtering curve is controlled to be loaded for the grid window corresponding to the first wavelength channel of the second optical signal received by the second input end b.

In this embodiment of this application, the optical switch module 202 has two input ends and one output end, so that optical signal scheduling can be implemented. Therefore, the optical switch module 202 may be considered as a 2×1 WSS (namely, a WSS with two input ends and one output end). A structure of the 2×1 WSS may be implemented in a plurality of optional implementations. The following two optional implementations are used as examples for description in this embodiment of this application.

Figure 13:
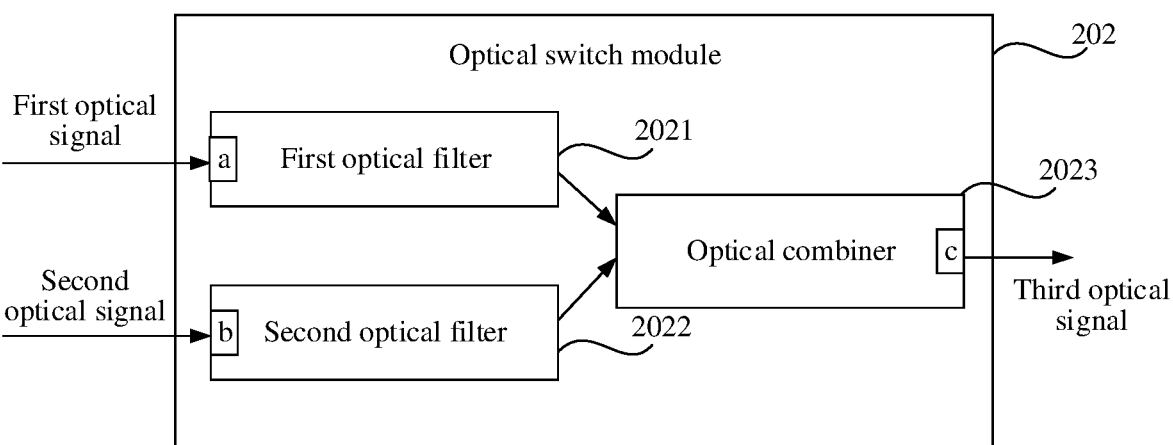
FIG. 13 is a schematic diagram of a structure of an example optical switch module according to an embodiment of this application.

In a first optional implementation, the optical switch module 202 mainly includes at least two optical filters. FIG. 13 is a schematic diagram of a structure of an example optical switch module 202 according to an embodiment of this application. As shown in FIG. 13, the optical switch module 202 includes: a first optical filter 2021 having an input end and an output end, where the input end of the first optical filter 2021 is the first input end a, and the first optical filter 2021 is configured to filter the received first optical signal; a second optical filter 2022 having an input end and an output end, where the input end of the second optical filter 2022 is the second input end b, the second optical filter 2022 is configured to filter the received second optical signal, and a filtering characteristic of the first optical filter is opposite to (or complementary to) that of the second optical filter 2022 for wavelength channels whose wavelengths are equal. For example, for wavelength channels whose wavelengths are equal, when the filtering characteristic of the first optical filter is a switch-on characteristic, the filtering characteristic of the second optical filter 2022 is a switch-off characteristic; or when the filtering characteristic of the first optical filter is a switch-off characteristic, the filtering characteristic of the second optical filter 2022 is a switch-on characteristic; and an optical combiner 2023, where the optical combiner 2023 has two input ends and one output end, the two input ends are respectively connected to the output end of the first optical filter 2021 and the output end of the second optical filter 2022, the output end of the optical combiner 2023 is the output end c of the optical switch module 202, and the optical combiner 2023 is configured to combine a filtered first optical signal and a filtered second optical signal that are received by the two input ends, to obtain the third optical signal. The combination means power combination.

For example, in a default state of the first optical filter, the first optical filter switches off all wavelength channels of the received optical signal (that is, has an all-off characteristic), and in a default state of the second optical filter, the second optical filter switches on all wavelength channels of the received optical signal (that is, has an all-on characteristic). In an optional example, at least one of the first optical filter or the second optical filter is a wavelength blocker (WB). For example, both the first optical filter and the second optical filter are wavelength blockers. The wavelength blocker has a wavelength selective characteristic.

In an optional manner, the first optical filter and the second optical filter may be implemented by using one of the following technologies: a liquid crystal on silicon (LCOS) technology, a digital light processing (DLP) technology, a planar lightwave circuit (PLC) technology, a liquid crystal (LC) technology, or a micro-electro-mechanical system (MEMS) technology.

In this embodiment of this application, a split ratio between the optical combiner and the input end connected to the first optical filter is not equal to a split ratio between the optical combiner and the input end connected to the second optical filter. For example, the split ratio between the optical combiner and the input end connected to the first optical filter is less than the split ratio between the optical combiner and the input end connected to the second optical filter. The split ratio is a proportion of a split path (a path that is of the optical combiner and that is connected to the first optical filter or another path that is of the optical combiner and that is connected to the second optical filter) optical signal to a combined path (an output path of the optical combiner) optical signal.

By setting the split ratio between the optical combiner and the input end connected to the first optical filter to be less than the split ratio between the optical combiner and the input end connected to the second optical filter, it can be ensured that a proportion of an optical power of the first optical signal to an optical power of the final output third optical signal is smaller, and that a proportion of the optical power of the second optical signal to the optical power of the final output third optical signal is larger. In this way, in the optical combiner, an insertion loss of a path from the input end connected to the first optical filter to the output end is less than an insertion loss of a path from the input end connected to the second optical filter to the output end. This reduces an insertion loss of the third optical signal during actual transmission in the optical combiner, thereby avoiding a loss of the service information.

Figure 14:
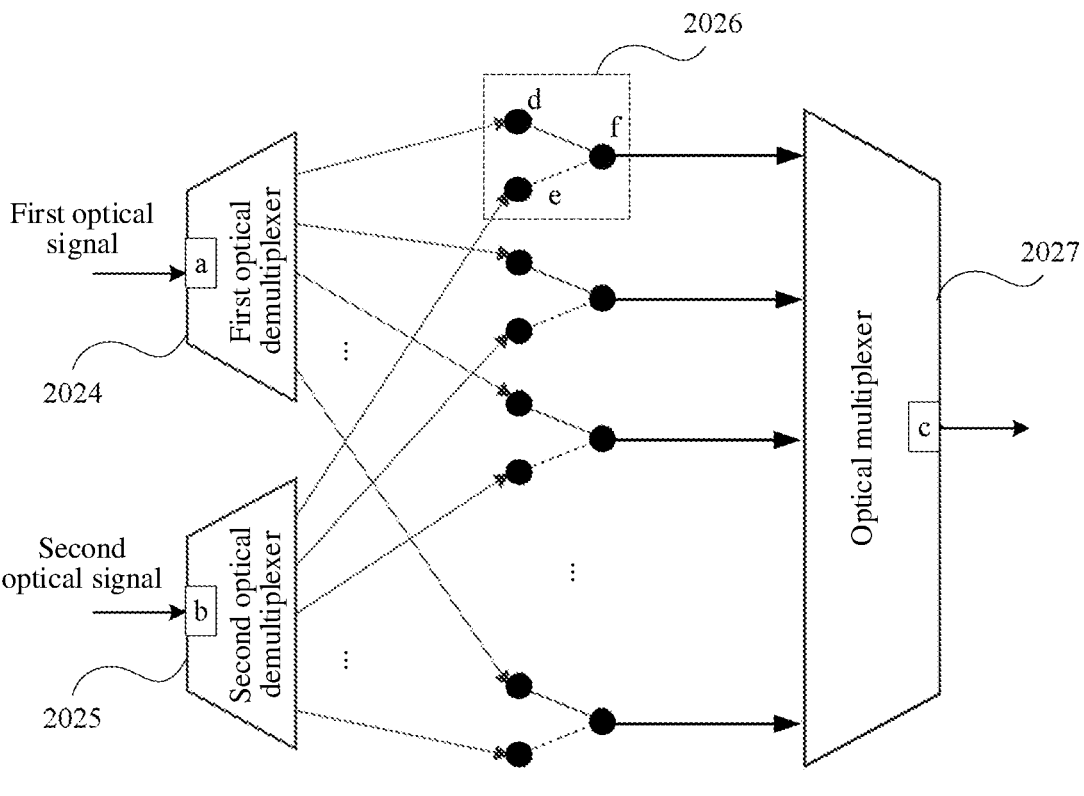
FIG. 14 is a schematic diagram of a structure of an example optical switch module according to an embodiment of this application.

In a second optional implementation, the optical switch module 202 mainly includes a plurality of optical switches (also referred to as an optical switch array). FIG. 14 is a schematic diagram of a structure of an example optical switch module 202 according to an embodiment of this application. As shown in FIG. 14, the optical switch module 202 includes: a first optical demultiplexer 2024 having an input end and n third output ends, a second optical demultiplexer 2025 having an input end and n fourth output ends, n optical switches 2026, and an optical combiner 2027, where n is a positive integer greater than 1, and n is usually equal to a quantity of specified wavelength channels in the target wavelength band. For example, if there are 80 specified wavelength channels, n=80. Each of the n optical switches 2026 has a third input end d, a fourth input end e, and a fifth output end f, and the optical combiner 2027 has n input ends and one output end.

The input end of the first optical demultiplexer 2024 is the first input end a, and the first optical demultiplexer 2024 is configured to: perform demultiplexing (or splitting) on the received first optical signal to obtain optical signals with n wavelength channels, and input the optical signals with the n wavelength channels to third input ends d of the n optical switches 2026 respectively through the n third output ends.

The input end of the second optical demultiplexer 2025 is the second input end b, and the second optical demultiplexer 2025 is configured to: perform demultiplexing on the received second optical signal to obtain optical signals with n wavelength channels, and input the optical signals with the n wavelength channels to fourth input ends e of the n optical switches 2026 respectively through the n fourth output ends.

Each optical switch 2026 is a 2×1 optical switch (namely, an optical switch with two input ends and one output end). A wavelength of the optical signal received from the third input end d of each optical switch 2026 is equal to that of the optical signal received from the fourth input end e of the optical switch 2026, and each optical switch 2026 is configured to select, from the optical signal received from the third input end d and the optical signal received from the fourth input end e, one path of optical signal to be output from the fifth output end f.

The output end of the optical combiner 2027 is the output end c of the optical switch module 202, the n input ends of the optical combiner 2027 are configured to respectively receive n optical signals output by the n optical switches 2026, and the optical combiner 2027 is configured to combine the n optical signals to obtain the third optical signal. The combination means power combination.

It should be noted that the optical switch module 202 may further include another structure. For example, for the first optional implementation, the optical switch module 202 may further include a controller, where the controller is configured to control filtering characteristics of two optical filters. For the second optional implementation, the optical switch module 202 may further include a controller, where the controller is configured to control channel selection of each optical switch. The controller may be a central processing unit (CPU), a peripheral control circuit, or the like. Optionally, the optical switch module 202 may be further connected to a controller of the optical signal control apparatus in which the optical switch module 202 is located or a controller of the optical transmission node in which the optical switch module 202 is located. The on/off states of the at least one wavelength channel of the first optical signal and the at least one wavelength channel of the second optical signal are adjusted under control of a control signal outside the optical switch module 202.

In summary, after the detection module detects that the power change of the second optical signal on the at least one wavelength channel is greater than the power change threshold, the optical switch module of the optical signal control apparatus provided in this embodiment of this application adjusts the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great (for example, the wavelength channel is in a wave add state or a wave drop state), the wavelength channel of the second optical signal whose power change is great is replaced with a corresponding wavelength channel of the first optical signal, to obtain the third optical signal. A power of the third optical signal is stable. This can reduce a wavelength channel combination change of the target wavelength band, and reduce a gain change of each wavelength channel in the optical amplifier and an optical power change of each wavelength channel caused by SRS, thereby reducing deterioration in an optical power and a signal-to-noise ratio of the wavelength channel, reducing bit errors of a receiver, and reducing impact on performance of the optical transmission system.

In addition, when the third optical signal is an optical signal whose target wavelength band is in the full-wave state, the performance deterioration in the remaining wavelength channel can be further reduced.

An additional port may be allocated to a conventional WSS in an optical transmission node, and the port is configured to receive dummy light. The WSS may perform mutual replacement between the dummy light and the true wave signal while performing various complex functions such as bandwidth adjustment of different wavelength channels, scheduling of different wavelengths between different ports, and optical power attenuation adjustment of wavelength channels. However, because a function of the WSS in the optical transmission node is complex, hardware performance cannot support quick replacement between the dummy light and the true wave signal. As a result, a service interruption time in the replacement process is excessively long, and a perceivable interruption delay is generated for an upper-layer service.

The optical signal control apparatus provided in this embodiment of this application is disposed outside the WSS in the optical transmission node. No additional port of the WSS device needs to be occupied, so that the structure of the WSS in the optical transmission node is simplified, and manufacturing costs of the WSS are reduced. In addition, because a structure of the optical signal control apparatus is simplified compared with that of the conventional WSS, the optical signal control apparatus can implement quick replacement between the dummy light and the true wave signal, and a replacement speed is increased from a conventional second level to a millisecond level. This reduces a possible service interruption time, or controls service interruption duration to be less than or equal to 50 ms, to implement an unperceivable interruption delay for the upper-layer service.

Figure 15:
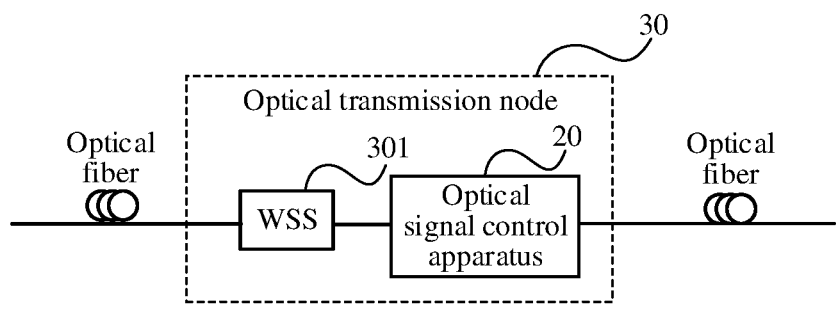
FIG. 15 is a schematic diagram of a structure of an optical transmission node according to an embodiment of this application.
Figure 16:
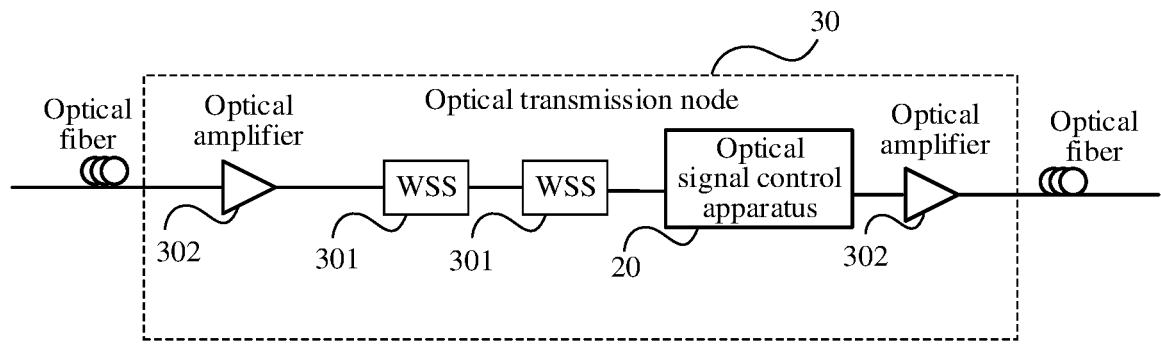
FIG. 16 is a schematic diagram of a structure of an optical transmission node according to an embodiment of this application.
Figure 17:
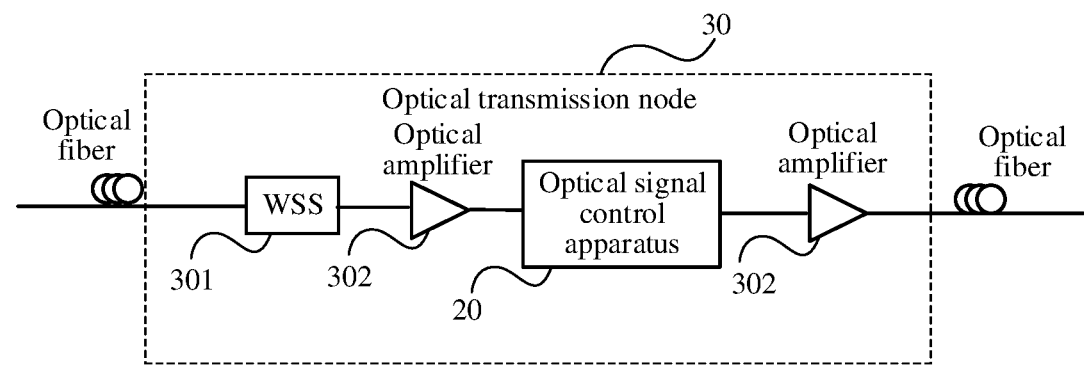
FIG. 17 is a schematic diagram of a structure of another optical transmission node according to an embodiment of this application.

The optical signal control apparatus 20 provided in this embodiment of this application may be disposed at any location of the optical transmission system depending on a requirement of the optical transmission system. For example, the optical signal control apparatus 20 may be disposed in the optical transmission node. FIG. 15 to FIG. 17 are schematic diagrams of structures of three optical transmission nodes 30 according to embodiments of this application. The optical transmission node 30 includes a WSS 301 and/or an optical amplifier 302. For example, the optical transmission node 30 is a reconfigurable optical add/drop multiplexer (ROADM) or an optical amplifier node, and the optical amplifier node includes a one-stage optical amplifier or multi-stage optical amplifiers.

In an optional manner, the optical transmission node 30 includes one or more WSSs 301, and an optical signal control apparatus 20 provided in this embodiment of this application is disposed after at least one WSS 301. For example, one optical signal control apparatus 20 is disposed after each WSS 301. In another optional manner, the optical transmission node 30 includes one or more optical amplifiers 302, and an optical signal control apparatus 20 provided in this embodiment of this application is disposed before at least one optical amplifier 302. For example, one optical signal control apparatus 20 is disposed before each optical amplifier 302.

In this embodiment of this application, the optical transmission node 30 may have a plurality of structures. For the structure of the optical transmission node 30, refer to FIG. 1, FIG. 2, FIG. 8, FIG. 15, FIG. 16, and FIG. 17. Alternatively, the foregoing several structures may be deformed. The structure of the optical transmission node is not limited in this embodiment of this application. In FIG. 8, one one-stage optical amplifier 302 is disposed after each WSS 301, and each optical signal control apparatus 20 is located between one WSS 301 and one one-stage optical amplifier 302.

In FIG. 16 and FIG. 17, the optical transmission node 30 includes multi-stage optical amplifiers 302, and the optical signal control apparatus 20 is located between any adjacent two-stage optical amplifiers 302 of the multi-stage optical amplifiers 302. It should be noted that the optical signal control apparatus 20 may be alternatively located before a first-stage optical amplifier (also referred to as an optical amplifier input stage) of the multi-stage optical amplifiers 302.

Figure 18:
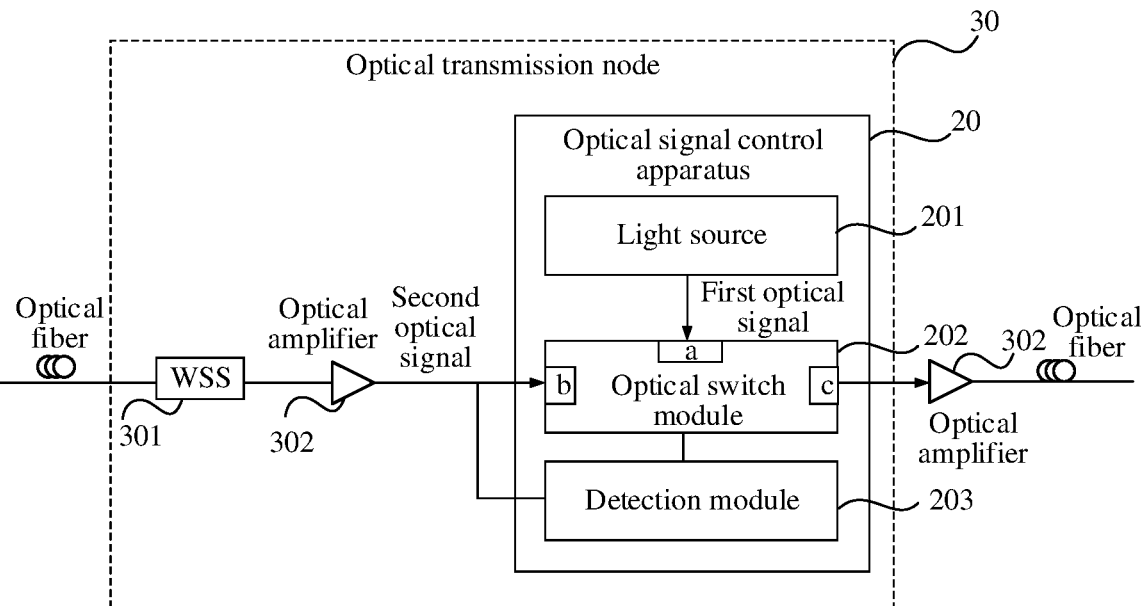
FIG. 18 is a schematic diagram of a structure of a specific optical transmission node according to an embodiment of this application.

FIG. 18 is a schematic diagram of a structure of a specific optical transmission node 30 according to an embodiment of this application. An example in which an optical switch module 202 of an optical signal control apparatus 20 is located between two-stage optical amplifiers 302 is used for description in FIG. 18. The optical switch module 202 may be alternatively located between a WSS 301 and a one-stage amplifier 302.

In this embodiment of this application, the optical amplifier may be an erbium-doped fiber amplifier (EDFA), a Raman amplifier, or another optical amplifier.

In this embodiment of this application, the target wavelength band within which the second optical signal falls may be an S wavelength band, a C wavelength band, or an L wavelength band. For example, an optical wavelength range of the S wavelength band is from 1460 nm to 1530 nm, an optical wavelength range of the C wavelength band is from 1530 nm to 1565 nm, and an optical wavelength range of the L wavelength band is from 1565 nm to 1625 nm.

In summary, after detecting that the power change of the second optical signal on the at least one wavelength channel is greater than the power change threshold, the optical signal control apparatus in the optical transmission node provided in this embodiment of this application adjusts the on/off states of the at least one wavelength channel of the received first optical signal and the at least one wavelength channel of the received second optical signal, so that the adjusted first optical signal and the adjusted second optical signal are combined to obtain the third optical signal, and the third optical signal is output. When the power change of the second optical signal on the at least one wavelength channel is great (for example, the wavelength channel is in a wave add state or a wave drop state), the second optical signal is updated to the third optical signal for output. This effectively reduces optical transmission performance deterioration in a remaining wavelength channel caused by the power change on the at least one wavelength channel.

Figure 19:
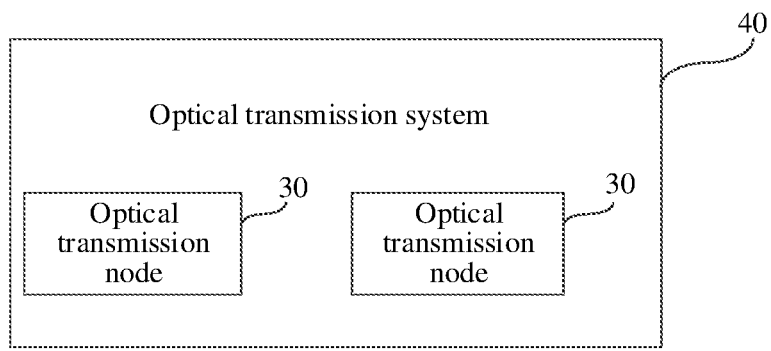
FIG. 19 is a schematic diagram of a structure of an optical transmission system according to an embodiment of this application.

An embodiment of this application provides an optical transmission system. The optical transmission system may include the optical signal control apparatus 20 provided in embodiments of this application. FIG. 19 is a schematic diagram of a structure of an optical transmission system 40 according to an embodiment of this application. The optical transmission system 40 includes at least two optical transmission nodes, and the optical transmission node is the optical transmission node 30 according to any one of the foregoing embodiments. Target wavelength bands corresponding to different optical transmission nodes 30 are different from each other. For example, the target wavelength bands corresponding to the at least two optical transmission nodes are any two or three of an S wavelength band, a C wavelength band, and an L wavelength band. For example, the optical transmission system 40 includes two optical transmission nodes 30, and corresponding target wavelength bands are the C wavelength band and the L wavelength band, respectively. In this case, a wavelength band of the optical transmission system 40 may be a C+L wavelength band. Alternatively, the optical transmission system 40 includes three optical transmission nodes 30, and corresponding target wavelength bands are the C wavelength band, the L wavelength band, and the S wavelength band, respectively. In this case, a wavelength band of the optical transmission system 40 may be an S+C+L wavelength band.

Figure 20:
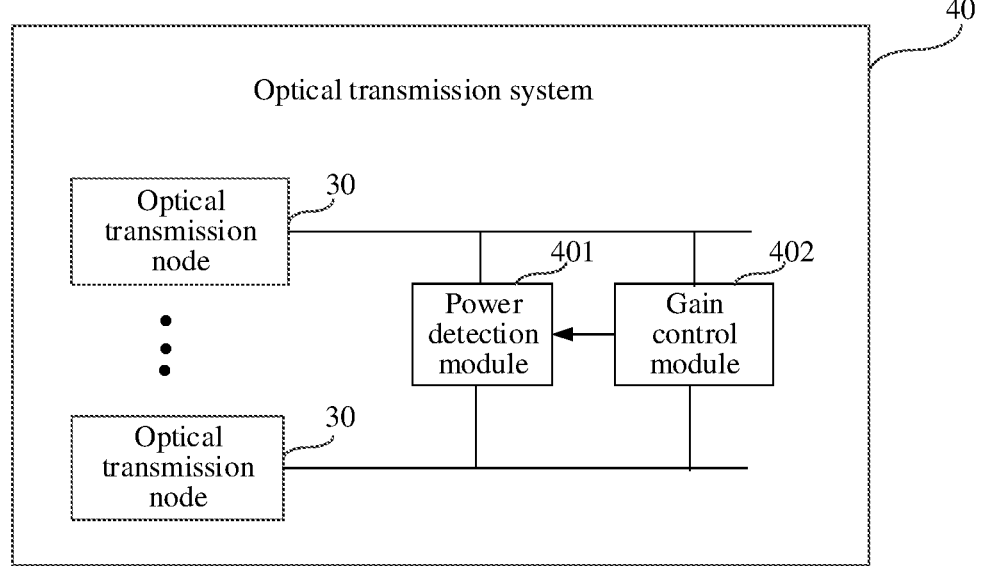
FIG. 20 is a schematic diagram of a structure of another optical transmission system according to an embodiment of this application.

FIG. 20 is a schematic diagram of a structure of another optical transmission system 40 according to an embodiment of this application. The optical transmission system 40 can reduce impact of a stimulated Raman scattering effect on an optical power. If each of the at least two optical transmission nodes includes an optical amplifier, the optical transmission system 40 further includes: a power detection module 401, configured to detect power information of the at least two optical transmission nodes 30, where the power information is optical power information; and a gain control module 402, configured to perform, based on the power information of the at least two optical transmission nodes 30, optical amplifier gain control on at least two target wavelength bands corresponding to the at least two optical transmission nodes 30.

Optionally, the power detection module 401 is further configured to: when detecting that power information of an optical transmission node 30 is less than a preset power value, output alarm information indicating that the power information of the optical transmission node 30 is less than the preset power value.

In this embodiment of this application, optical amplifier gain control is performed on the at least two target wavelength bands based on the power information of the at least two optical transmission nodes 30, to reduce, through optical amplifier gain adjustment, power transfer caused by the stimulated Raman scattering effect, thereby improving reliability of the optical transmission system.

Figure 21:
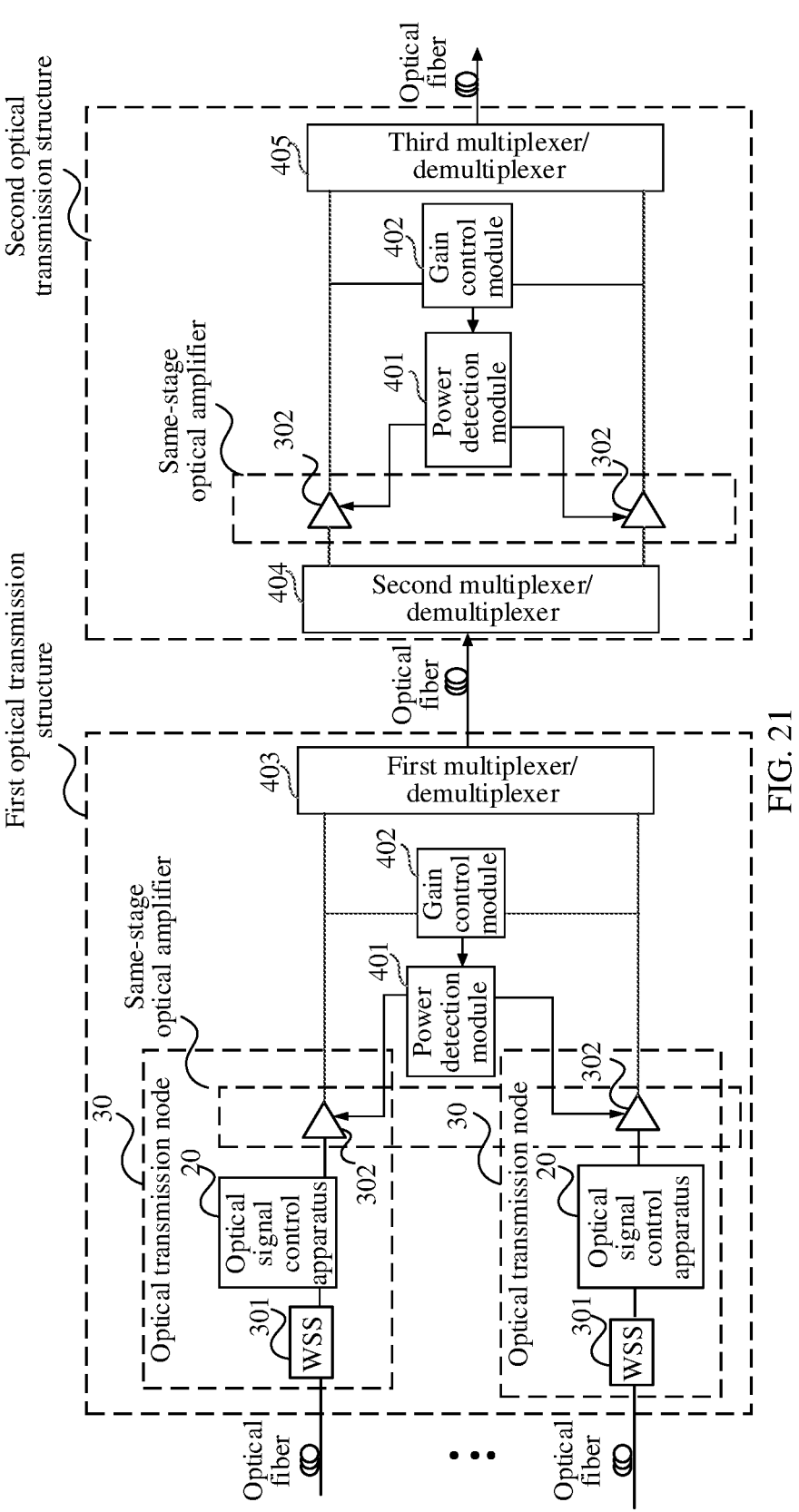
FIG. 21 is a schematic diagram of a structure of still another optical transmission system according to an embodiment of this application.

An embodiment of this application provides an optical transmission structure. The optical transmission structure includes the at least two optical transmission nodes 30. An example in which the optical transmission system includes one optical transmission structure is used for description in the foregoing embodiments. During actual implementation, the optical transmission system may include a plurality of optical transmission structures. FIG. 21 is a schematic diagram of a structure of still another optical transmission system 40 according to an embodiment of this application. As shown in FIG. 21, the optical transmission system 40 includes a plurality of optical transmission structures, each optical transmission structure includes a plurality of optical transmission nodes, and at least one optical transmission structure includes the power detection module 401 and the gain control module 402. An example in which the optical transmission system 40 includes two optical transmission structures is used for description in FIG. 21. The two optical transmission structures are a first optical transmission structure and a second optical transmission structure. The first optical transmission structure includes a plurality of optical transmission nodes, each optical transmission node 30 includes an optical signal control apparatus 20, and the second optical transmission structure includes a plurality of optical transmission nodes. An example in which the optical transmission nodes 30 included in the first optical transmission structure are ROADMs and the optical transmission nodes 30 included in the second optical transmission structure are optical amplifier nodes is used for description in FIG. 21.

An optical transmission structure in which a power amplifier control structure is disposed in the optical transmission system is used as an example. The optical transmission structure includes s groups of power amplifier control structures (not shown in the figure), where s is a positive integer. Each group of power amplifier control structures includes a power detection module 401 and a gain control module 402. The power detection module 401 in each group of power amplifier control structures is configured to feed back detected power information to the corresponding gain control module 402. The optical transmission structure includes a one-stage optical amplifier or multi-stage optical amplifiers, and a group of power amplifier control structures may be disposed after an optical amplifier of at least one stage. For example, a group of power amplifier control structures may be disposed after an optical amplifier R of each stage, and the group of power amplifier control structures is configured to control the optical amplifier R of this stage. Optionally, an i-stage optical amplifiers of the optical transmission structure include an $i^{th}$ optical amplifier that is in each of the at least two optical transmission nodes and that is arranged in an optical signal transmission direction (namely, a direction in which an optical signal is transmitted on a main line of an optical fiber), where $1 \le i \le I$, and I is a total quantity of optical amplifiers in each optical transmission node. Optionally, $s \le I$, for example, I=s. In FIG. 21, it is assumed that both the first optical transmission structure and the second optical transmission structure include one-stage optical amplifier. In other words, in the two optical transmission structures, I=1, and a group of power amplifier control structures is disposed after each one-stage optical amplifier.

Each optical amplifier has an input end, an output end, and a control end, and the optical amplifier is disposed in a main line of an optical link by using the input end and the output end. Assuming that a power amplifier control structure M1 is configured to control an optical amplifier M2 of a specific stage in the optical transmission system 40, a power detection module 401 in the power amplifier control structure M1 is configured to obtain power information of the output end of each optical amplifier in the optical amplifier M2 of the specific stage. A gain control module 402 in the power amplifier control structure M1 is configured to output a control signal to the control end of each optical amplifier in the optical amplifier M2 of the specific stage, to control an optical amplifier gain of the optical amplifier.

In this embodiment of this application, the optical transmission structure further includes another structure. For example, the optical transmission structure further includes a multiplexer/demultiplexer, and the multiplexer/demultiplexer is configured to perform optical signal multiplexing and/or demultiplexing. In FIG. 21, that the first optical transmission structure in the optical transmission system 40 includes a first multiplexer/demultiplexer 403 and the second optical transmission structure in the optical transmission system 40 includes a second multiplexer/demultiplexer 404 and a third multiplexer/demultiplexer 405 is used as an example for illustration. However, a quantity and locations of the multiplexers/demultiplexers are not limited. In addition, an example in which an optical signal control apparatus 20 is disposed only in the first optical transmission structure is used for description in FIG. 21. During actual implementation, an optical signal control apparatus 20 may also be disposed in the second optical transmission structure while an optical signal control apparatus 20 is disposed in the first optical transmission structure. Alternatively, no optical signal control apparatus 20 is disposed in the first optical transmission structure, and an optical signal control apparatus 20 is disposed in the second optical transmission structure.

In an optional manner, the power information is instantaneous power values. For each group of power amplifier control structures, the gain control module 402 is configured to: calculate a power change value of each of the at least two optical transmission nodes based on the instantaneous power values of the at least two optical transmission nodes; and perform optical amplifier gain control on the at least two target wavelength bands based on the power change value of each optical transmission node.

Figure 22:
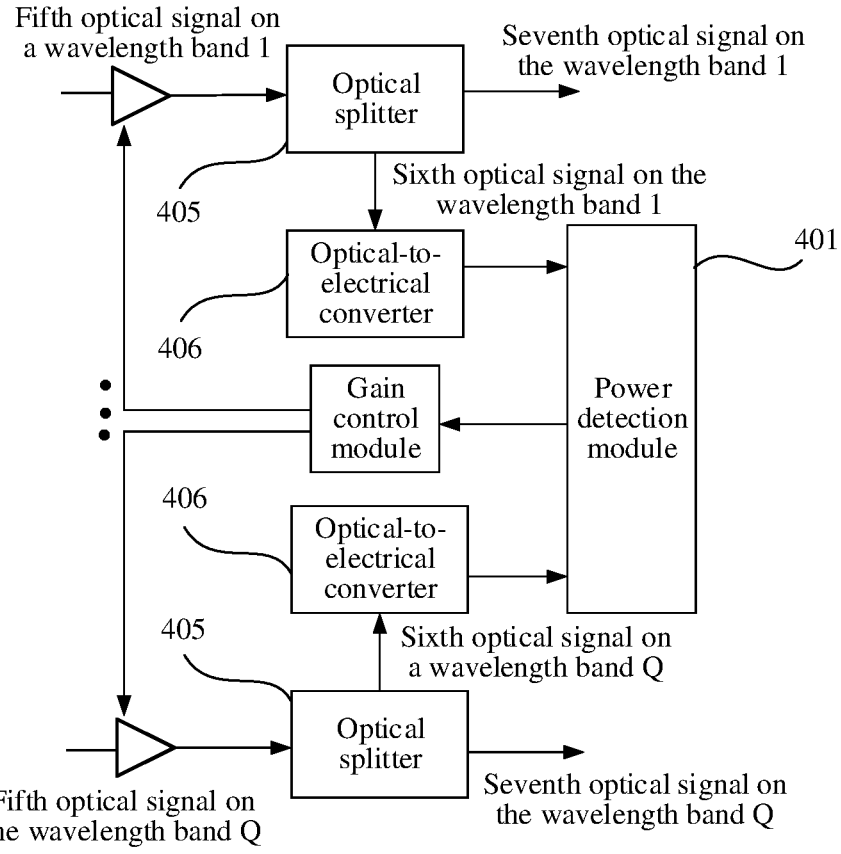
FIG. 22 is a schematic diagram of a power amplifier control structure according to an embodiment of this application.

FIG. 22 is a schematic diagram of a power amplifier control structure according to an embodiment of this application. It is assumed that an optical transmission structure in which a power amplifier control structure is disposed includes Q optical transmission nodes, and Q≥2, for example, 2≤Q≤3. The power amplifier control structure further includes Q optical splitters 405 and optical-to-electrical converters 406, each of which is connected to a corresponding optical splitter. The Q optical splitters 405 are in a one-to-one correspondence with the Q optical transmission nodes.

Each optical splitter 405 is configured to split a fifth optical signal in a target wavelength band corresponding to an optical transmission node corresponding to the optical splitter 405 into a sixth optical signal with a partial power, and the optical splitter 405 may be disposed on an optical link for transmitting the fifth optical signal. The optical splitter 405 has one input end and two output ends, and splits the fifth optical signal input from the input end into two channels: the sixth optical signal in the target wavelength band and a seventh optical signal in the target wavelength band, where the seventh optical signal is a new fifth optical signal. A power of the new fifth optical signal is reduced compared with a power of the fifth optical signal input to the optical splitter, but an amount of carried service information is not reduced. In this process, the split part of the fifth optical signal is used for power information detection. For example, a ratio of the power of the seventh optical signal to the power of the fifth optical signal ranges from 1% to 10%, for example, the ratio of the power of the seventh optical signal to the power of the fifth optical signal is 5%. This can ensure that optical signal splitting has small impact on the power of the seventh optical signal.

The optical-to-electrical converter 406 is configured to convert the received sixth optical signal into an electrical signal, and output the converted electrical signal to the power detection module 401. For example, the optical-to-electrical converter 406 may be a PD.

In a group of power amplifier control structures, the power detection module 401 is configured to determine an instantaneous power value of an optical power of each of Q target wavelength bands based on received electrical signals transmitted by the Q optical-to-electrical converters 406, where the instantaneous power value of the optical power of each of the Q target wavelength bands is instantaneous power values of Q same-stage optical amplifiers corresponding to different target wavelength bands. The Q optical amplifiers are optical amplifiers used by the power detection module 401 to perform detection.

In an optional manner, the gain control module 402 is configured to determine a power change value of each of the Q target wavelength bands based on a stimulated Raman scattering effect model and the instantaneous power value of the optical power of each of the Q target wavelength bands. The stimulated Raman scattering effect model satisfies the following equation:

$$(\Delta P\_1, \Delta P\_2, \ldots, \Delta P\_Q) = f(P\_1, P\_2, \ldots, P\_Q),$$
where f represents the stimulated Raman scattering effect model, P_1 to P_Q respectively represent instantaneous power values of an optical power of the Q target wavelength bands, and $\Delta P\_1$ to $\Delta P\_Q$ respectively represent power change values of the Q target wavelength bands. For example, the stimulated Raman scattering effect model may be a machine learning model.

Optionally, the stimulated Raman scattering effect model further needs to determine the power change value of each of the Q target wavelength bands based on other parameters and the instantaneous power value of the optical power of each of the Q target wavelength bands. The other parameters include: optical fiber lengths, optical fiber types, optical amplifier type parameters, fixed insertion losses, and/or specified coefficients corresponding to the Q target wavelength bands. The optical fiber length is a length of an optical fiber from a multiplexing port of the Q optical transmission nodes to a demultiplexing port of a next group of optical transmission nodes, that is, a length of an optical fiber from an optical transmission structure to a next optical transmission structure. Using FIG. 21 as an example, an optical fiber length of the first optical transmission structure is a length of an optical fiber from the first optical transmission structure to the second optical transmission structure. Likewise, the optical fiber type is a type of the optical fiber from the multiplexing port of the Q optical transmission nodes to the demultiplexing port of the next group of optical transmission nodes.

The other parameters may be pre-delivered by a main controller or a network management system in the optical transmission system to the gain control module 402. The other parameters may be periodically updated to ensure accuracy of the parameters. The gain control module 402 may store the other parameters in a form of a parameter table. For example, Table 1 is a schematic table of the parameter table stored by the gain control module 402. A table whose table identifier is K1 is used as an example. Other parameters recorded in the table include an optical fiber length of 80 km (kilometer), an optical fiber type of G.652, an optical amplifier type of OA_x, and a fixed insertion loss of IL01.

TABLE 1

| Parameter table | Optical fiber length | 80 km | 80 km |
|---|---|---|---|
| | Optical fiber type | G.652 | G.654 |
| | Optical amplifier type | OA_x | OA_x |
| | Fixed insertion loss | IL01 | IL02 |
| | Table identifier | K1 | K2 |

Correspondingly, the gain control module 402 is further configured to separately perform, based on the determined power change values of the Q target wavelength bands: $\Delta P\_1$, $\Delta P\_2$, . . . , and $\Delta P\_Q$, gain control on the optical amplifiers corresponding to the Q target wavelength bands. For example, power changes caused by a stimulated Raman scattering effect are inversely compensated, so that performance of the system is more stable. For example, assuming that $\Delta P\_1=5$ dB, a power change value of 5 dB is controlled to be subtracted for an optical amplifier corresponding to a wavelength band 1. Assuming that $\Delta P\_1=-5$ dB, a power change value of 5 dB is controlled to be added for the optical amplifier corresponding to the wavelength band 1.

It should be noted that the optical transmission system 40 may further include another structure, for example, one or more of an optical transmitter, an optical receiver, the network management system, the main controller, a wavelength division multiplexer, or an optical modulator. Details are not described in this embodiment of this application.

The optical signal control apparatus, the optical transmission node, and the optical transmission system that are provided in embodiments of this application can be used in the following methods. For a working procedure and a working principle of each module in embodiments of this application, refer to descriptions in the following embodiments.

Figure 23:
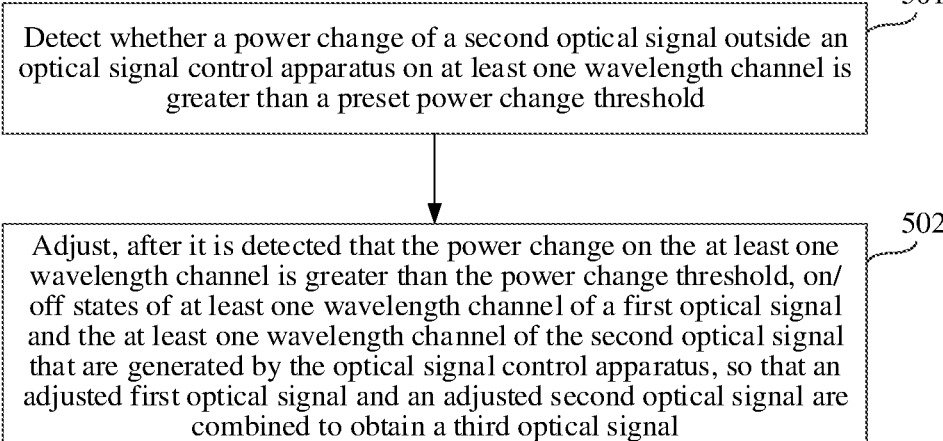
FIG. 23 is a schematic flowchart of an optical signal control method according to an embodiment of this application.

FIG. 23 is a schematic flowchart of an optical signal control method according to an embodiment of this application. The method can be applied to the foregoing optical signal control apparatus. As shown in FIG. 23, the method includes the following steps:

S501: Detect whether a power change of a second optical signal outside the optical signal control apparatus on at least one wavelength channel is greater than a preset power change threshold.

In an optional implementation, that the power change on the at least one wavelength channel is greater than the power change threshold indicates a wave drop state or a wave add state, the wave drop state is a state in which the at least one wavelength channel changes from having a wave to having no wave, and the wave add state is a state in which the at least one wavelength channel changes from having no wave to having a wave.

S502: Adjust, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal.

As shown in FIG. 9, a process in which the optical signal control apparatus adjusts the on/off states of the at least one wavelength channel of the first optical signal and the at least one wavelength channel of the second optical signal includes: controlling mutual replacement between a wavelength channel of the first optical signal and a wavelength channel of the second optical signal, where wavelengths of the two wavelength channels are equal to each other. The mutual replacement process includes: replacing a first wavelength channel of the second optical signal with a first wavelength channel of the first optical signal, or replacing the first wavelength channel of the first optical signal with the first wavelength channel of the second optical signal. A wavelength of the first wavelength channel of the second optical signal is equal to that of the first wavelength channel of the first optical signal. In this way, a wavelength channel combination of the final output third optical signal can be made unchanged relative to the second optical signal (namely, a second optical signal before a wave add or a wave drop) transmitted by a transmitting end.

In an optional manner, the optical signal control apparatus (for example, a detection module 203) may detect the wave drop state or the wave add state by detecting a pilot signal. In an optional example, a pilot signal having a plurality of pilot frequencies is modulated on wavelength channels of the second optical signal that carry service information, and the plurality of pilot frequencies respectively correspond to a plurality of wavelength channels. After detecting that at least one pilot frequency is switched from a signal non-lost state to a signal lost state, the optical signal control apparatus determines that a wavelength channel corresponding to the at least one pilot frequency is in the wave drop state; or after detecting that at least one pilot frequency is switched from a signal lost state to a signal non-lost state, the optical signal control apparatus determines that a wavelength channel corresponding to the at least one pilot frequency is in the wave add state.

Correspondingly, in an optional implementation, in S502, a process of adjusting, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal includes: after it is determined that the first wavelength channel of the second optical signal is in the wave drop state, controlling the first wavelength channel of the first optical signal to be switched on, and control the first wavelength channel of the second optical signal to be switched off. For example, first filtering processing is performed on the first wavelength channel to make the first wavelength channel switched on, where the wavelength of the first wavelength channel that is switched on falls within a band-pass filtering range.

In another optional implementation, in S502, a process of adjusting, after it is detected that the power change on the at least one wavelength channel is greater than the power change threshold, on/off states of at least one wavelength channel of a first optical signal and the at least one wavelength channel of the second optical signal that are generated by the optical signal control apparatus, so that an adjusted first optical signal and an adjusted second optical signal are combined to obtain a third optical signal includes: after it is determined that the first wavelength channel of the second optical signal is in the wave add state, controlling the first wavelength channel of the first optical signal to be switched off, and controlling the first wavelength channel of the second optical signal to be switched on, where the wavelength of the first wavelength channel of the first optical signal is equal to that of the first wavelength channel of the second optical signal. For example, second filtering processing is performed on the first wavelength channel to make the first wavelength channel switched off, where the wavelength of the first wavelength channel that is switched off falls within a band-stop filtering range.

For the foregoing process of controlling the on/off of the wavelength channels, refer to the corresponding process performed by the optical switch module 202.

According to the optical signal control method provided in this embodiment of this application, the on/off states of the at least one wavelength channel of the received first optical signal and the at least one wavelength channel of the received second optical signal are adjusted after it is detected that the power change of the second optical signal on the at least one wavelength channel is greater than the power change threshold, so that the adjusted first optical signal and the adjusted second optical signal are combined to obtain the third optical signal, and the third optical signal is output. When the power change of the second optical signal on the at least one wavelength channel is great (for example, the wavelength channel is in a wave add state or a wave drop state), the wavelength channel of the second optical signal whose power change is great is replaced with a corresponding wavelength channel of the first optical signal, to obtain the third optical signal. A power of the third optical signal is stable. This can reduce a wavelength channel combination change of a target wavelength band, and reduce a gain change of each wavelength channel in an optical amplifier and an optical power change of each wavelength channel caused by SRS, thereby reducing deterioration in an optical power and a signal-to-noise ratio of the wavelength channel, reducing bit errors of a receiver, and reducing impact on performance of an optical transmission system.

In addition, when the third optical signal is an optical signal whose target wavelength band is in a full-wave state, performance deterioration in a remaining wavelength channel can be further reduced.

It should be noted that a sequence of the steps of the optical signal control method provided in this embodiment of this application may be appropriately adjusted, and the steps may also be correspondingly added or deleted depending on a situation. All variant methods readily figured out by a person skilled in the art within the technical scope disclosed in this application shall fall within the protection scope of this application, and therefore are not described.

Figure 24:
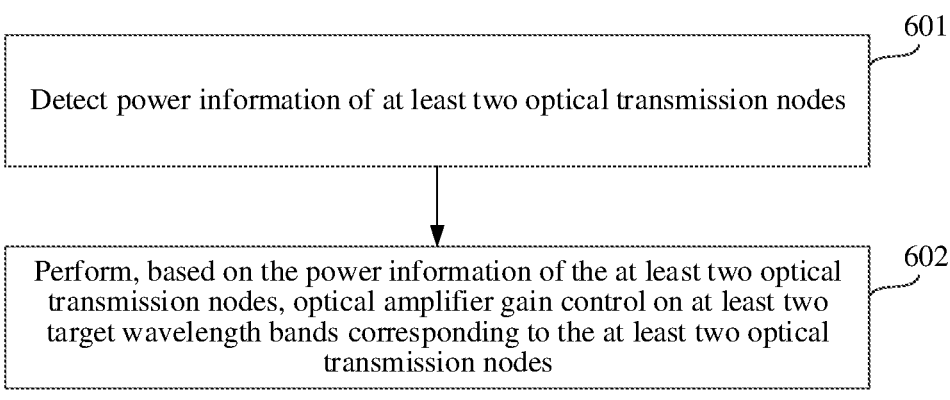
FIG. 24 is a schematic flowchart of an optical signal control method according to an embodiment of this application.

FIG. 24 is a schematic flowchart of an optical signal control method according to an embodiment of this application. The method can be applied to the foregoing optical transmission system. The optical transmission system includes at least two optical transmission nodes. Target wavelength bands corresponding to the different optical transmission nodes are different from each other. As shown in FIG. 24, the method includes the following steps:

S601: Detect power information of at least two optical transmission nodes.

The power information is instantaneous power values, namely, instantaneous power values of optical powers. For each optical transmission node, the fifth optical signal transmitted on a main line of an optical link may be split into a sixth optical signal with a partial power, the sixth optical signal may be converted into an electrical signal, and an instantaneous power value of the optical transmission node may be determined based on the converted electrical signal.

S602: Perform, based on the power information of the at least two optical transmission nodes, optical amplifier gain control on at least two target wavelength bands corresponding to the at least two optical transmission nodes.

For example, a process of performing optical amplifier gain control in S602 may include the following steps:

A1: Calculate a power change value of each of the at least two optical transmission nodes based on the instantaneous power values of the at least two optical transmission nodes.

For example, it is assumed that the optical transmission system 40 has one or more optical transmission structures, where a first optical transmission structure is one of the one or more optical transmission structures, and the first optical transmission structure includes Q optical transmission nodes, $Q \geq 2$, for example, $2 \leq Q \leq 3$. For the first optical transmission structure, a power change value of each of Q target wavelength bands is determined based on a stimulated Raman scattering effect model and an instantaneous power value of an optical power of each of the Q target wavelength bands; and the stimulated Raman scattering effect model satisfies the following equation:

$$(\Delta P\_1, \Delta P\_2, \ldots, \Delta P\_Q) = f(P\_1, P\_2, \ldots, P\_Q),$$
where f represents the stimulated Raman scattering effect model, $P\_1$ to $P\_Q$ respectively represent instantaneous power values of optical powers of the Q target wavelength bands, and $\Delta P\_1$ to $\Delta P\_Q$ respectively represent power change values of the Q target wavelength bands. For example, the stimulated Raman scattering effect model may be a machine learning model.

Optionally, the stimulated Raman scattering effect model further needs to determine the power change value of each of the Q target wavelength bands based on other parameters and the instantaneous power value of the optical power of each of the Q target wavelength bands. The other parameters include: lengths and types of optical fibers connected to the Q optical transmission nodes, optical amplifier type parameters, fixed insertion losses, and/or specified coefficients corresponding to the Q target wavelength bands. The other parameters may be pre-delivered by a main controller or a network management system in the optical transmission system to the gain control module 402. The other parameters may be periodically updated to ensure accuracy of the parameters. The gain control module 402 may store the other parameters in a form of the parameter table listed in Table 1.

A2: Perform optical amplifier gain control on the at least two target wavelength bands based on the power change value of each optical transmission node.

For example, based on the determined power change values of the Q target wavelength bands: $\Delta P\_1$, $\Delta P\_2$, ... , and $\Delta P\_Q$ (namely, the power change values of all the optical transmission nodes), gain control is separately performed on optical amplifiers corresponding to the Q target wavelength bands. For example, power changes caused by a stimulated Raman scattering effect are inversely compensated, so that performance of the system is more stable.

The optical signal control method may be performed by a group of power amplifier control structures in the optical transmission system. During actual implementation, the at least two optical transmission nodes include a one-stage optical amplifier or multi-stage optical amplifiers, and a group of power amplifier control structures may be disposed after an optical amplifier of at least one stage. For example, a group of power amplifier control structures may be disposed after an optical amplifier R of each stage, and the group of power amplifier control structures is configured to control the optical amplifier R of this stage. Each group of power amplifier control structures is configured to perform S601 and S602.

In this embodiment of this application, optical amplifier gain control is performed on the at least two target wavelength bands based on the power information of the at least two optical transmission nodes, to reduce, through optical amplifier gain adjustment, power transfer caused by the stimulated Raman scattering effect, thereby improving reliability of the optical transmission system.

The optical signal control methods provided in FIG. 23 and FIG. 24 may be alternatively performed by a same computer device, and the computer device may be the main controller in the optical transmission system.

It should be noted that a sequence of the steps of the optical signal control method provided in this embodiment of this application may be appropriately adjusted, and the steps may also be correspondingly added or deleted depending on a situation. All variant methods readily figured out by a person skilled in the art within the technical scope disclosed in this application shall fall within the protection scope of this application, and therefore are not described.

It can be clearly understood by a person skilled in the art that, for the purpose of convenient and brief description, for specific steps of the methods described above, refer to corresponding processes in the foregoing embodiments corresponding to the optical signal control apparatus, the optical transmission node, and the optical transmission system. Details are not described herein again.

Figure 25:
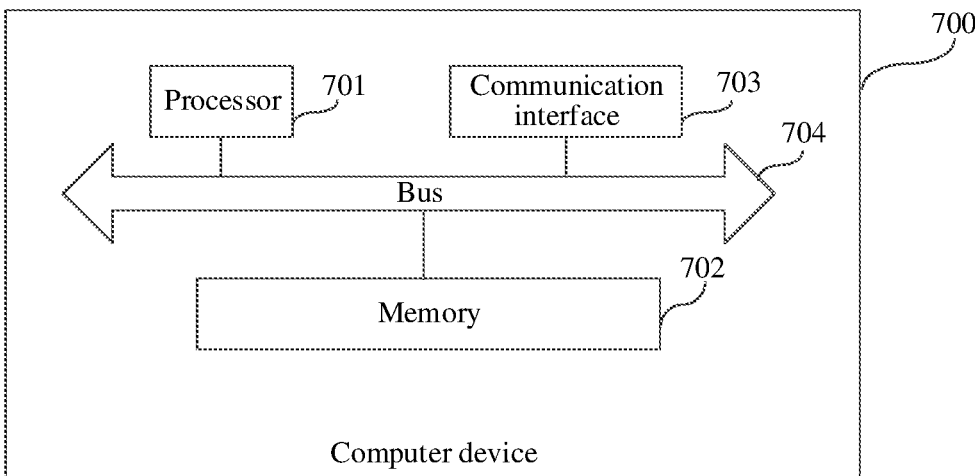
FIG. 25 shows a possible basic hardware architecture of a computer device according to an embodiment of this application.

Optionally, FIG. 25 shows a possible basic hardware architecture of a computer device according to an embodiment of this application.

As shown in FIG. 25, the computer device 700 includes a processor 701, a memory 702, a communication interface 703, and a bus 704.

There may be one or more processors 701 in the computer device 700, and FIG. 25 shows only one processor 701. Optionally, the processor 701 may be a CPU. If the computer device 700 has a plurality of processors 701, types of the plurality of processors 701 may be different or identical. Optionally, the plurality of processors 701 in the computer device 700 may be integrated into a multi-core processor.

The memory 702 stores computer instructions and data. The memory 702 may store computer instructions and data needed to implement the optical signal control methods provided in this application. For example, the memory 702 stores instructions for implementing steps of the optical signal control methods. The memory 702 may be any one or any combination of the following storage media: a nonvolatile memory (for example, a read-only memory (ROM), a solid-state drive (SSD), a hard disk drive (HDD), and an optical disk) and a volatile memory.

The communication interface 703 may be any one or any combination of the following components with a network access function: a network interface (for example, an Ethernet interface), a wireless network interface card, and the like.

The communication interface 703 is used by the computer device 700 to perform data communication with another computer device or a terminal.

The bus 704 may connect the processor 701 to the memory 702 and the communication interface 703. In this way, the processor 701 may access the memory 702 by using the bus 704, and may further perform data interaction with another computer device or a terminal by using the communication interface 703.

In this application, the computer device 700 executes the computer instructions in the memory 702, so that the computer device 700 implements the optical signal control methods provided in this application or the computer device 700 deploys the optical signal control apparatuses.

In an example embodiment, a non-transitory computer-readable storage medium including instructions is further provided, for example, the memory including instructions. The instructions may be executed by the processor of the computer device to complete the optical signal control methods described in embodiments of this application. For example, the non-temporary computer-readable storage medium may be a ROM, a random access memory (RAM), a CD-ROM, a magnetic tape, a floppy disk, or an optical data storage device.

All or some of the foregoing embodiments may be implemented by using software, hardware, firmware, or any combination thereof. When all or some of the foregoing embodiments are implemented by using software, all or some of the foregoing embodiments may be implemented in a form of a computer program product. The computer program product includes one or more computer instructions. When the computer program instructions are loaded and executed on a computer, the procedures or functions according to embodiments of this application are completely or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, terms "first", "second", and "third" are merely used for description, but cannot be understood as an indication or an implication of relative importance. A term "at least one" means one or more, and a term "a plurality of" means two or more, unless expressly limited otherwise. That B is referenced by A means that A is the same as B or A is a simple variant of B. That a wavelength channel A is corresponding to a wavelength channel B means that wavelengths of the wavelength channel A and the wavelength channel B are the same. In the foregoing embodiments of this application, "wavelengths" are optical wavelengths, and "powers" are optical powers.

It should be noted that when the optical signal control apparatuses provided in the foregoing embodiment perform the optical signal control methods, the division of the foregoing functional modules is merely used as an example for description. In actual application, the foregoing functions can be allocated to different functional modules for implementation depending on a requirement, that is, internal structures of the devices are divided into different functional modules to implement all or some of the functions described above. In addition, embodiments corresponding to the optical signal control apparatus, the optical transmission node, the optical transmission system, and the optical signal control method that are provided in the foregoing embodiments belong to a same concept. For specific implementation processes thereof, refer to the method embodiments. Details are not described again herein.

A person of ordinary skill in the art may understand that all or some of the steps in the foregoing embodiments may be implemented by using hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. An apparatus, comprising:
a light source, configured to output a first optical signal;
an optical switch circuit, wherein a first input of the optical switch circuit is configured to receive the first optical signal, a second input of the optical switch circuit is configured to receive a second optical signal, the second optical signal is received from outside the apparatus, and an output of the optical switch circuit is configured to output a third optical signal; and
a detection circuit, configured to detect whether a power change of the second optical signal on at least one wavelength channel is greater than a preset power change threshold, wherein the power change of the second optical signal on the at least one wavelength channel being greater than the preset power change threshold indicates a wave drop state or a wave add state, the wave drop state is a state in which the at least one wavelength channel of the second optical signal changes from having a wave to having no wave, and the wave add state is a state in which the at least one wavelength channel of the second optical signal changes from having no wave to having a wave; and
wherein the optical switch circuit is configured to:
after the detection circuit detects that the power change of the second optical signal on the at least one wavelength channel is greater than the preset power change threshold, adjust on/off states of at least one wavelength channel of the first optical signal and the at least one wavelength channel of the second optical signal, to obtain an adjusted first optical signal and an adjusted second optical signal, wherein the adjusted first optical signal and the adjusted second optical signal are combined to obtain the third optical signal.

2. The apparatus according to claim 1, wherein a pilot signal having a plurality of pilot frequencies is modulated on wavelength channels of the second optical signal that carry service information, and the plurality of pilot frequencies respectively correspond to a plurality of wavelength channels;
wherein the detection circuit is configured to detect the pilot signal; and
wherein the optical switch circuit is configured to:
after the detection circuit detects that at least one pilot frequency of the plurality of pilot frequencies is switched from a signal non-lost state to a signal lost state, determine that a wavelength channel corresponding to the at least one pilot frequency is in the wave drop state; or
after the detection circuit detects that at least one pilot frequency of the plurality of pilot frequencies is switched from a signal lost state to a signal non-lost state, determine that a wavelength channel corresponding to the at least one pilot frequency is in the wave add state.

3. The apparatus according to claim 1, wherein the optical switch circuit is configured to:
after determining that a first wavelength channel of the second optical signal is in the wave drop state, control a first wavelength channel of the first optical signal received by the first input of the optical switch circuit to be switched on, and control a first wavelength channel of the second optical signal received by the second input of the optical switch circuit to be switched off; or
after determining that a first wavelength channel of the second optical signal is in the wave add state, control a first wavelength channel of the first optical signal received by the first input of the optical switch circuit to be switched off, and control the first wavelength channel of the second optical signal received by the second input of the optical switch circuit to be switched on, wherein a wavelength of the first wavelength channel of the first optical signal is equal to a wavelength of the first wavelength channel of the second optical signal.

4. The apparatus according to claim 1, wherein the optical switch circuit is configured to:
replace a first wavelength channel of the second optical signal with a first wavelength channel of the first optical signal, or replace the first wavelength channel of the first optical signal with the first wavelength channel of the second optical signal, wherein a wavelength of the first wavelength channel of the second optical signal is equal to a wavelength of the first wavelength channel of the first optical signal, and the first wavelength channel of the second optical signal is one or more of the at least one wavelength channel corresponding to the power change of the second optical signal being greater than the preset power change threshold.

5. The apparatus according to claim 1, further comprising:
an optical splitter, configured to split the second optical signal to obtain a fourth optical signal with a partial power; and
an optical-to-electrical converter, configured to convert the fourth optical signal into a converted electrical signal, and output the converted electrical signal to the detection circuit.

6. The apparatus according to claim 1, wherein the optical switch circuit further comprises:
a first optical filter, wherein an input of the first optical filter is the first input of the optical switch circuit, and the first optical filter is configured to filter the first optical signal;
a second optical filter, wherein an input of the second optical filter is the second input of the optical switch circuit, the second optical filter is configured to filter the second optical signal, and a filtering characteristic of the first optical filter is complementary to that of the second optical filter for wavelength channels whose wavelengths are equal; and an optical combiner, wherein the optical combiner has two inputs and one output, the two inputs are respectively connected to an output of the first optical filter and an output of the second optical filter, the output of the optical combiner is the output of the optical switch circuit, and the optical combiner is configured to combine a filtered first optical signal and a filtered second optical signal that are received by the two inputs of the optical combiner to obtain the third optical signal.

7. The apparatus according to claim 6, wherein a split ratio between the optical combiner and the input of the optical combiner that is connected to the first optical filter is less than a split ratio between the optical combiner and the input of the optical combiner that is connected to the second optical filter.

8. The apparatus according to claim 1, wherein the optical switch circuit further comprises:

a first optical demultiplexer having an input and n third outputs, wherein n is a positive integer greater than 1;

a second optical demultiplexer having an input and n fourth outputs;

n optical switches, wherein each of the n optical switches has a third input, a fourth input, and a fifth output; and an optical combiner, wherein the optical combiner has n inputs and one output;

wherein the input of the first optical demultiplexer is the first input of the optical switch circuit, and the first optical demultiplexer is configured to: perform demultiplexing on the first optical signal to obtain fifth optical signals with n wavelength channels, and input the fifth optical signals with the n wavelength channels to third inputs of the n optical switches respectively through the n third outputs;

wherein the input of the second optical demultiplexer is the second input of the optical switch circuit, and the second optical demultiplexer is configured to: perform demultiplexing on the second optical signal to obtain sixth optical signals with n wavelength channels, and input the sixth optical signals with the n wavelength channels to fourth inputs of the n optical switches respectively through the n fourth outputs;

wherein a wavelength of an optical signal received from the third input of each optical switch is equal to that of an optical signal received from the fourth input of a respective optical switch, and each optical switch is configured to select, from the optical signal received from the third input and the optical signal received from the fourth input of the respective optical switch, one path of optical signal to be output from the fifth output; and wherein the output of the optical combiner is the output of the optical switch circuit, the n inputs of the optical combiner are configured to respectively receive n optical signals output by the n optical switches, and the optical combiner is configured to combine the n optical signals to obtain the third optical signal.

9. A system, comprising:

at least two optical transmission nodes, wherein at least one optical transmission node of the at least two optical transmission nodes comprises a wavelength selective switch (WSS) or an optical amplifier, wherein the at least one optical transmission node of the at least two optical transmission nodes further comprises an apparatus, and wherein each apparatus comprises:

a light source, configured to output a first optical signal;

an optical switch circuit, wherein a first input of the optical switch circuit is configured to receive the first optical signal, a second input of the optical switch circuit is configured to receive a second optical signal, and an output of the optical switch circuit is configured to output a third optical signal; and a detection circuit, configured to detect whether a power change of the second optical signal on at least one wavelength channel is greater than a preset power change threshold, wherein the power change of the second optical signal on the at least one wavelength channel being greater than the preset power change threshold indicates a wave drop state or a wave add state, the wave drop state is a state in which the at least one wavelength channel of the second optical signal changes from having a wave to having no wave, and the wave add state is a state in which the at least one wavelength channel of the second optical signal changes from having no wave to having a wave;

wherein each optical switch circuit is configured to: after a corresponding detection circuit detects that the power change of the second optical signal on the at least one wavelength channel is greater than the preset power change threshold, adjust on/off states of at least one wavelength channel of the first optical signal and the at least one wavelength channel of the second optical signal, to obtain an adjusted first optical signal and an adjusted second optical signal, wherein the adjusted first optical signal and the adjusted second optical signal are combined to obtain the third optical signal; and wherein target wavelength bands corresponding to different optical transmission nodes are different from each other.

10. The system according to claim 9, wherein the at least one optical transmission node comprises the optical amplifier, and the system further comprises:

a power detection circuit, configured to detect power information of the at least two optical transmission nodes; and a gain control circuit, configured to perform, based on the power information of the at least two optical transmission nodes, optical amplifier gain control on at least two target wavelength bands corresponding to the at least two optical transmission nodes.

11. The system according to claim 10, wherein the power information is instantaneous power values, and the gain control circuit is configured to:

calculate a power change value of each of the at least two optical transmission nodes based on the instantaneous power values of the at least two optical transmission nodes; and perform optical amplifier gain control on the at least two target wavelength bands based on the power change value of each optical transmission node.

12. A method, comprising:

detecting whether a power change of a second optical signal on at least one wavelength channel of the second optical signal is greater than a preset power change threshold, wherein the power change of the second optical signal on the at least one wavelength channel being greater than the preset power change threshold indicates a wave drop state or a wave add state, the wave drop state is a state in which the at least one wavelength channel of the second optical signal changes from having a wave to having no wave, and the wave add state is a state in which the at least one wavelength channel of the second optical signal changes from having no wave to having a wave, and wherein the second optical signal is received by an apparatus from outside of the apparatus; and adjusting, after it is detected that the power change of the second optical signal on the at least one wavelength channel is greater than the preset power change threshold, on/off states of at least one wavelength channel of a first optical signal and the at least one wavelength channel of the second optical signal, to obtain an adjusted first optical signal and an adjusted second optical signal, wherein the adjusted first optical signal and the adjusted second optical signal are combined to obtain a third optical signal.

13. The method according to claim 12, wherein a pilot signal having a plurality of pilot frequencies is modulated on wavelength channels of the second optical signal that carry service information, and the plurality of pilot frequencies respectively correspond to a plurality of wavelength channels, and the method further comprises:

determining that a wavelength channel corresponding to at least one pilot frequency of the plurality of pilot frequencies is in the wave drop state after it is detected that the at least one pilot frequency of the plurality of pilot frequencies is switched from a signal non-lost state to a signal lost state; or determining that a wavelength channel corresponding to the at least one pilot frequency of the plurality of pilot frequencies is in the wave add state after it is detected that the at least one pilot frequency of the plurality of pilot frequencies is switched from a signal lost state to a signal non-lost state.

14. The method according to claim 12, wherein adjusting, after it is detected that the power change of the second optical signal on the at least one wavelength channel is greater than the preset power change threshold, the on/off states of the at least one wavelength channel of the first optical signal and the at least one wavelength channel of the second optical signal, to obtain the adjusted first optical signal and the adjusted second optical signal, wherein the adjusted first optical signal and the adjusted second optical signal are combined to obtain the third optical signal comprises:

after it is determined that a first wavelength channel of the second optical signal is in the wave drop state, controlling a first wavelength channel of the first optical signal to be switched on, and controlling the first wavelength channel of the second optical signal to be switched off; or after it is determined that the first wavelength channel of the second optical signal is in the wave add state, controlling the first wavelength channel of the first optical signal to be switched off, and controlling the first wavelength channel of the second optical signal to be switched on, wherein a wavelength of the first wavelength channel of the first optical signal is equal to a wavelength of the first wavelength channel of the second optical signal.

15. The method according to claim 14, wherein controlling the first wavelength channel of the first optical signal to be switched on comprises:

performing first filtering processing on the first wavelength channel to make the first wavelength channel be switched on, wherein a wavelength of the first wavelength channel that is switched on falls within a band-pass filtering range; and wherein controlling the first wavelength channel of the second optical signal to be switched off comprises:

performing second filtering processing on the first wavelength channel to make the first wavelength channel switched off, wherein the wavelength of the first wavelength channel that is switched off falls within a band-stop filtering range.

16. The method according to claim 12, wherein adjusting, after it is detected that the power change on the at least one wavelength channel is greater than the preset power change threshold, the on/off states of the at least one wavelength channel of the first optical signal and the at least one wavelength channel of the second optical signal, to obtain an adjusted first optical signal and an adjusted second optical signal, wherein the adjusted first optical signal and the adjusted second optical signal are combined to obtain a third optical signal, comprises:

replacing a first wavelength channel of the second optical signal with the first wavelength channel of the first optical signal, or replacing the first wavelength channel of the first optical signal with the first wavelength channel of the second optical signal, wherein a wavelength of the first wavelength channel of the second optical signal is equal to that of the first wavelength channel of the first optical signal, and the first wavelength channel of the second optical signal is one or more of the at least one wavelength channel corresponding to the power change greater than the preset power change threshold.

17. A non-transitory computer-readable storage medium, wherein the non-transitory computer-readable storage medium stores executable computer instructions, and the executable computer instructions, when executed, instruct a computer device to:

detect whether a power change of a second optical signal on at least one wavelength channel is greater than a preset power change threshold, wherein the power change of the second optical signal on the at least one wavelength channel being greater than the preset power change threshold indicates a wave drop state or a wave add state, the wave drop state is a state in which the at least one wavelength channel of the second optical signal changes from having a wave to having no wave, and the wave add state is a state in which the at least one wavelength channel of the second optical signal changes from having no wave to having a wave; and adjust, after it is detected that the power change of the second optical signal on the at least one wavelength channel is greater than the preset power change threshold, on/off states of at least one wavelength channel of a first optical signal and the at least one wavelength channel of the second optical signal, to obtain an adjusted first optical signal and an adjusted second optical signal, wherein the adjusted first optical signal and the adjusted second optical signal are combined to obtain a third optical signal.

* * * * *